United States Patent [19]

Toensing et al.

[11] Patent Number: 5,560,078
[45] Date of Patent: Oct. 1, 1996

[54] PORTABLE BLOWER/VAC

[75] Inventors: Dean R. Toensing, Minnetonka; Steven J. Svoboda, Bloomington; Anthony N. Pink, Shorewood, all of Minn.

[73] Assignee: The Toro Company, Bloomington, Minn.

[21] Appl. No.: 434,728

[22] Filed: May 4, 1995

[51] Int. Cl.⁶ ........................................................ A47L 5/14
[52] U.S. Cl. ............................... 15/339; 15/344; 15/405; 15/330; 15/410
[58] Field of Search .............................. 15/339, 344, 405

[56] References Cited

U.S. PATENT DOCUMENTS

| | | | |
|---|---|---|---|
| 2,068,496 | 1/1937 | Linghammar | 15/155 |
| 2,586,145 | 2/1952 | Breuer et al. | 299/11 |
| 4,325,163 | 4/1982 | Mattson et al. | 15/330 |
| 4,413,371 | 11/1983 | Tuggle et al. | 15/405 |
| 4,553,284 | 11/1985 | Strumbos | 15/414 |
| 4,644,606 | 2/1987 | Luerken et al. | 15/330 |
| 4,674,146 | 6/1987 | Tuggle et al. | 15/330 |
| 4,694,528 | 9/1987 | Comer et al. | 15/330 |
| 4,870,714 | 10/1989 | Miner | 15/327 |
| 4,945,604 | 8/1990 | Miner et al. | 15/344 |
| 5,035,586 | 7/1991 | Sadler et al. | 417/363 |
| 5,222,275 | 6/1993 | Baker et al. | 15/329 |
| 5,245,726 | 9/1993 | Rote et al. | 15/339 |

OTHER PUBLICATIONS

Parts Catalog for Toro 700 Rake–O–Vac® Blower, Model No. 51547–4900001 & up; Form No. 3316–626, Copyright 1993.
Operator's Manual for Paramount® Electric Blower Models: PB150/165/170/250/350/350–5940, Copyright 1993.
Paramount® Parts List No. 534–500069, publication date Dec. 12, 1990.
Photographs of Paramount® PB–100 Blower/vac.

*Primary Examiner*—Chris K. Moore
*Attorney, Agent, or Firm*—Donald S. Trevarthen

[57] ABSTRACT

An improved convertible electric blower/vac. The blower/vac includes an improved air inlet cover with an adjustable choke member. The air inlet cover also includes a pressure ring for increasing the efficiency of the blower/vac impeller when the unit is operated in the blower mode. The blower/vac also includes a blower tube and a vacuum bag collar, each with resilient tabs that engage receptacles on the blower/vac to retain the blower tube and vacuum bag collar on the unit. The housing outlet of the blower/vac includes guides that interact with longitudinal ribs on the blower tube and the vacuum bag collar to reduce unwanted rotational deflection of the blower tube and vacuum bag collar when either is engaged on the housing outlet. The blower/vac includes an improved vacuum tube for use of the blower/vac in the vacuum mode.

10 Claims, 15 Drawing Sheets

5,560,078

PORTABLE BLOWER/VAC

TECHNICAL FIELD

This invention pertains to electric blower/vacs. Specifically, this invention pertains to electric blower/vacs which are readily convertible between the blower mode and the vacuum mode. This application is related to S/N 08/375,150 filed on Jan. 19, 1995 and entitled Portable Blower/Vacuum Handle Arrangement.

BACKGROUND OF THE INVENTION

Convertible blower/vac units are in common use by homeowners and professionals for the removal of debris from yards and driveways. A convertible blower/vac is a device which can be used as a blower or which can be converted to operate as a vacuum.

In blower operation, typical blower/vac units provide a sweeping action created by the production of a fast moving stream of air from a rotating impeller within a housing. A removable exhaust or blower tube generally carries the air stream from the housing of the unit so that a nozzle at the outlet of the blower tube can be near the ground while the unit is being held by the operator. The nozzle at the end of the blower tube is generally smaller than the outlet port on the housing of the unit, thus causing a higher velocity air stream at the nozzle and allowing for greater precision and force in blowing debris across a surface.

Conversion from the blower mode to the vacuum typically requires removing the blower tube from the housing outlet and placing a debris catching vacuum bag on the outlet. An air inlet cover is removed from the housing inlet and a vacuum tube is placed over the inlet. In vacuum operation, the hand held device draws air and debris through the vacuum tube. Debris is reduced as it is drawn up through the impeller. The debris is then propelled into the vacuum bag for disposal.

Modern units are typically hand-held and, therefore, are made of lightweight materials and utilize lightweight power sources. The two most common power sources for the units are electric and gasoline motors.

One prior art portable blower/vac is disclosed in U.S. Pat. No. 5,222,275 issued to Baker et al. on Jun. 29, 1993. Baker discloses a convertible electric blower/vac with a removable air inlet cover and means for attaching a blower tube, a vacuum bag, and a vacuum tube to the housing.

U.S. Pat. No. 4,644,606 issued to Luerken et al. on Feb. 24, 1987 discloses a convertible gas engine powered blower/vac with a vacuum tube with a generally circular cross-section. Luerken et al. also discloses a blower tube with a generally circular cross-section. Luerken et al. also discloses an air inlet cover with no means for adjusting the inlet area although the air volume and speed through the blower/vac can be adjusted by varying the throttle setting of the gas engine which drives the impeller.

U.S. Pat. No. 4,694,528 issued to Comer et al. on Sep. 22, 1987 discloses a convertible electric blower/vac with a removable air inlet cover including means for adjusting the air inlet area of the cover. The means for adjusting the inlet area includes a series of axially (in relation to the fan motor shaft) disposed air inlet openings and a concentrically mounted air choke with a series of axially disposed spokes. When the choke is rotated such that the choke spokes cover the air inlet openings, the air inlet area is reduced and the resultant airflow through the blower/vac is reduced. When the choke is rotated such that the choke spokes move away from and expose the air inlet openings, the inlet area is increased and the resultant air flow through the blower/vac is increased. Comer et al. also discloses a blower tube and a vacuum tube of a generally circular cross-section. The vacuum tube is attached over the air inlet of the housing by means of a bayonet-type fitting while the blower tube is attached to the housing outlet by means of a shallow, fine pitch screw thread. The air inlet cover includes a pressure ring for increasing the efficiency of the impeller when the unit is operated in the blower mode. The pressure ring is integral with the member forming the air inlet openings but is a separate component from the air inlet cover proper.

U.S. Pat. No. 4,413,371 issued to Tuggle et al. on Nov. 8, 1983 discloses a power blower with a blower tube that tapers from a generally circular cross-section at its upstream end to a generally rectangular cross-section at its downstream end.

U.S. Pat. No. 4,325,163 issued to Mattson et al. on Apr. 20, 1982 discloses a convertible electric blower/vac with a removable air inlet cover. The air inlet cover does not include any means for adjusting the air inlet area of the cover. Mattson et al. also discloses a blower tube with a generally circular cross-section wherein the blower tube is joined to the housing outlet by means of a friction fit. The vacuum tube is also connected to the housing by means of a friction fit while the vacuum bag is attached the housing outlet by means of a strap which secures the bag inlet around the housing outlet.

U.S. Pat. No. 4,945,604 issued to Miner et al. on Aug. 7, 1990 discloses a portable blower with a blower tube having a circular cross-section at its upstream end and a generally rectangular cross-section at its downstream end. The blower tube is removably connected to the blower by means of a bayonet-type fitting arrangement.

U.S. Pat. No. 2,586,145 issued to Breuer et al. on Feb. 19, 1952 discloses a convertible electric blower/vac with a removable nozzle for use in the blower mode. The nozzle is removably connected to the downstream end of the blower tube by means of sliding engagement collar and pin connector system. A resilient finger cooperates with the sliding engagement collar to retain the removable nozzle on the blower tube. The removable nozzle has generally circular cross-section at its upstream end and a generally rectangular cross-section at its downstream end. The outlet portion of the nozzle is disposed at an angle of approximately 60° from the longitudinal axis of the neck or upstream portion.

U.S. Pat. No. 5,035,588 issued to Sadler et al. on Jul. 30, 1991 discloses a convertible gasoline powered blower/vac with means for resiliently and frictionally engaging a blower tube or a vacuum outlet tube into the housing outlet. The blower tube has a generally circular cross-section at its upstream end and a generally rectangular cross-section at its downstream end.

U.S. Pat. No. 4,553,284 discloses a vacuum cleaner universal nozzle made from a resilient material which is manually deformable such that the inlet opening and configuration can be altered by the operator to suit operating conditions.

U.S. Pat. No. 2,068,496 issued to Linghammar on May 21, 1936 discloses a vacuum tube with a generally cylindrical upstream portion and a funnel shaped downstream portion. The funnel shaped downstream portion is made of a flexible material and can thus be deformed to conform to irregular shape surfaces. Linghammar also discloses a series of longitudinal ribs running along the inner surface of the funnel shaped downstream portion. These ribs prevent the flexible funnel shaped downstream portion from collapsing due to the partial vacuum created by the fan.

Toro parts catalog, form No. #3316-626, 1993 copyright to The Toro Company discloses a convertible electric blower/vacuum with a removable air inlet cover. The air inlet cover includes means for adjusting the air inlet area. The means for adjusting the air inlet area includes a series of axially (in relation to the fan motor shaft) disposed air inlet openings and a concentrically mounted air choke with a series of axially disposed spokes. When the choke is rotated such that the choke spokes cover the air inlet openings, the air inlet area is reduced and the resultant airflow through the blower/vac is reduced. When the choke is rotated such that the choke spokes move away from and expose the air inlet openings, the inlet area is increased and the resultant airflow through the blower/vac is increased. The convertible electric blower/vac also includes a pressure ring that is integral with the member forming the air inlet openings, but the pressure ring is a separate component from the air inlet cover proper.

Paramount operator's manual #534-886570-8, 1993 copyright to Paramount Division of WCI Outdoor Products, Inc. discloses a convertible electric blower/vac with a removable air inlet cover that includes means for adjusting the inlet area through the air inlet cover. The means for adjusting the inlet area includes a series of radially disposed openings on the air inlet cover. A pivoting choke member is fastened to the air inlet cover and includes a series of radially disposed spokes. When the choke is rotated such that the spokes obstruct the radially disposed openings on the cover, airflow through the blower/vac is reduced. When the choke is rotated such that the spokes move away from the cover openings, then airflow through the blower/vac is increased. The Paramount unit does not include axially disposed choke spokes or inlet cover openings, nor does it include a pressure ring.

The Paramount PB-100 power blower manufactured in 1990 and shown in the Paramount parts list #534-500069 dated Dec. 12, 1990, discloses an electric blower including an air inlet cover with an adjustable choke member. The air inlet cover and the choke member each include a series of radially disposed spokes and air inlet openings as well as a series of axially disposed spokes and air inlet openings. The choke member is mounted concentrically on the air inlet cover and can be rotated such that in one position the spokes of the choke member cover the air inlet openings of the air inlet cover. In the other position, the spokes of the choke member are rotated away from the air inlet openings, thus exposing the openings and allowing air to pass through the air inlet cover. The air inlet cover of the Paramount PB-100 does not include a pressure ring for increasing the efficiency of the impeller in the blower mode.

The present system offers an alternate convertible blower/vac. In particular, the present invention includes a convertible electric blower/vac with an improved air inlet cover and adjustable choke member. The present invention also includes an improved system for attaching a blower tube and a vacuum bag assembly to the housing outlet of the blower/vac housing. The present invention also includes an improved vacuum tube for use of the blower/vac in the vacuum mode. The present invention also includes means for reducing unwanted rotational deflection of the blower tube when it is engaged on the housing outlet.

SUMMARY OF THE INVENTION

Accordingly, the present invention includes an improved convertible electric blower/vac.

Specifically, this invention includes an improved air inlet cover and adjustable choke member wherein the air inlet cover includes a pressure ring for increasing the efficiency of the blower/vac impeller in the blower mode. The choke member of the air inlet cover could also include an extended choke lever for ease of adjusting the choke member.

This invention can also include an improved blower tube including an improved means for connecting the blower tube to the housing outlet. The blower tube can include a series of longitudinal ribs extending along the internal surface of the blower tube from the upstream end toward the downstream end wherein the ribs engage the housing outlet when the blower tube is engaged over the housing outlet. The blower tube can include an improved downstream end for increasing the exiting air velocity.

This invention can also include an improved housing outlet for engaging and retaining the blower tube when it is engaged on the housing outlet.

This invention on can also include an improved vacuum bag collar for connecting a vacuum bag to the blower/vac wherein the vacuum bag collar includes means for connecting the vacuum bag collar to the housing outlet. The vacuum bag collar can include a series of longitudinal ribs extending along the internal surface of the vacuum bag collar from the upstream end toward the downstream end wherein the ribs engage the housing outlet when the vacuum bag collar is engaged over the housing outlet.

The air inlet cover of the present invention can also include a plurality of quarter-spherical indentations each adapted to receive a fingertip so as to permit the air inlet cover to be grasped and rotated with ease when engaging the air inlet cover over the air inlet opening of the housing.

This invention can also include an improved vacuum tube for use with the blower/vac in the vacuum mode.

BRIEF DESCRIPTION OF THE DRAWINGS

This invention will be further described with reference to the appended Drawing, wherein.

DETAILED DESCRIPTION OF A PREFERRED EMBODIMENT

Figure 1:
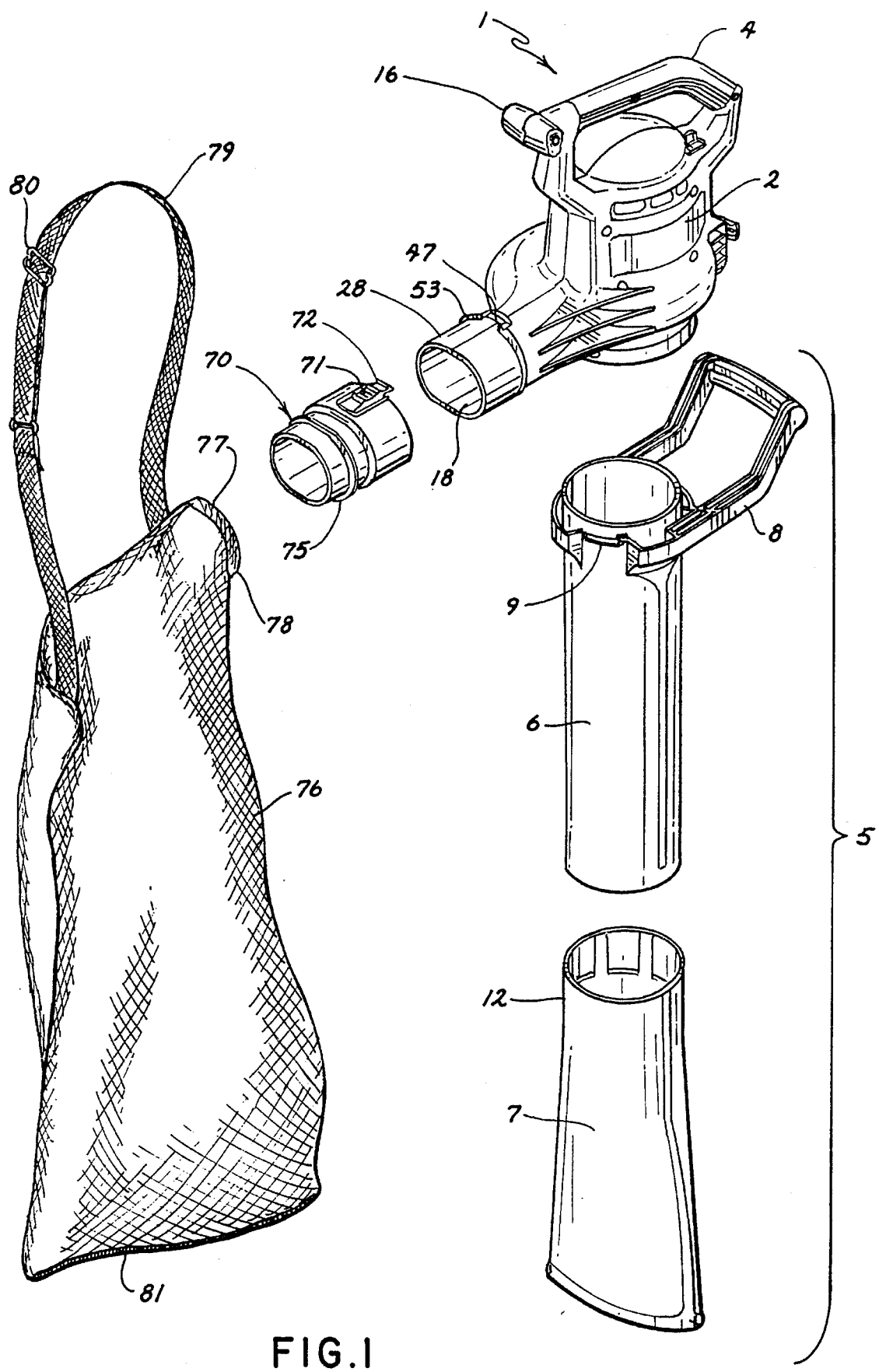
FIG. 1 is an exploded view of a preferred embodiment convertible electric blower/vac set up for operation in the vacuum mode.

In the description which follows, like parts are indicated throughout the specification with the same reference numerals, respectively.

Figure 2:
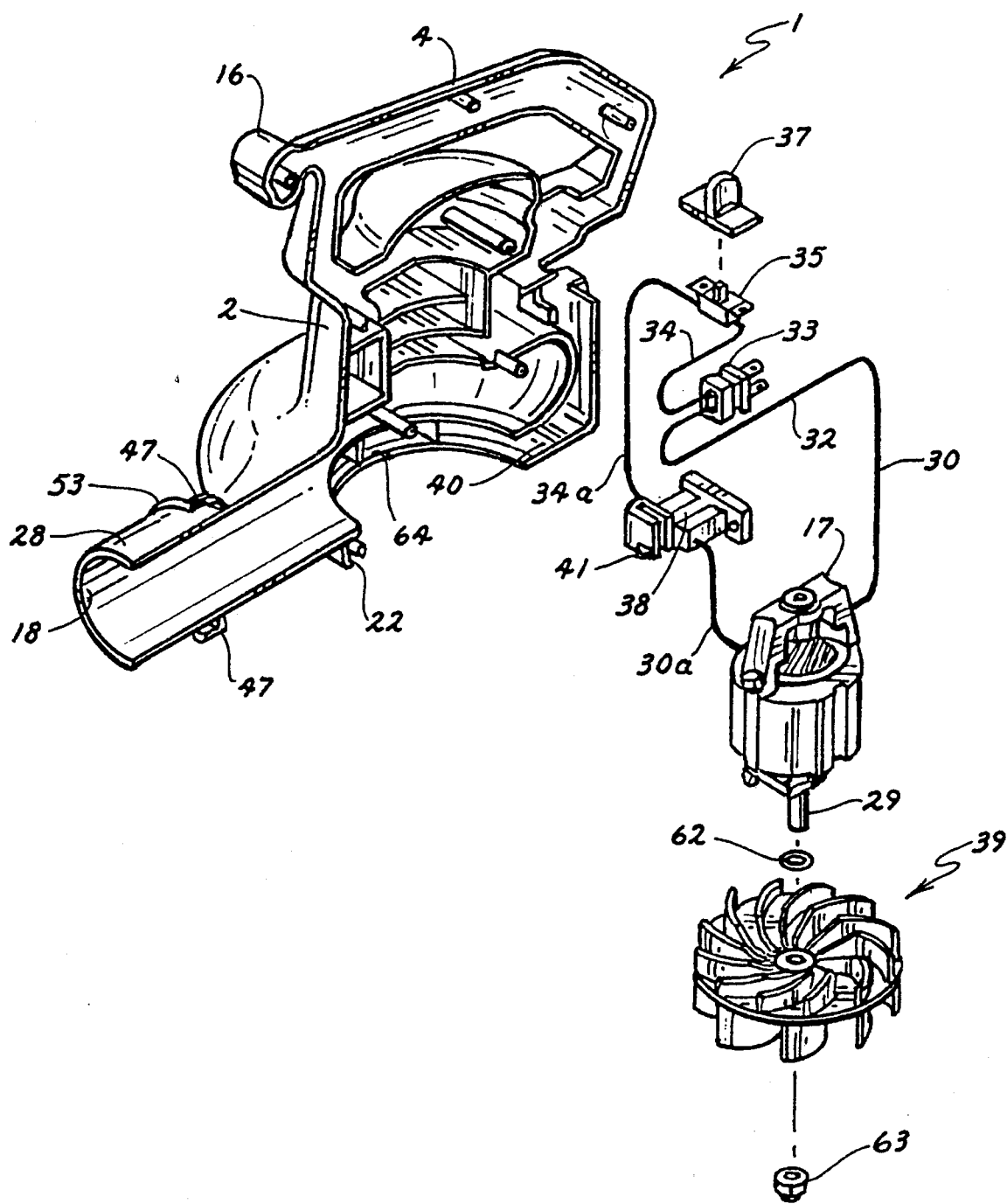
FIG. 2 is an exploded view of the housing, motor and impeller assembly of the preferred blower/vac.
Figure 4:
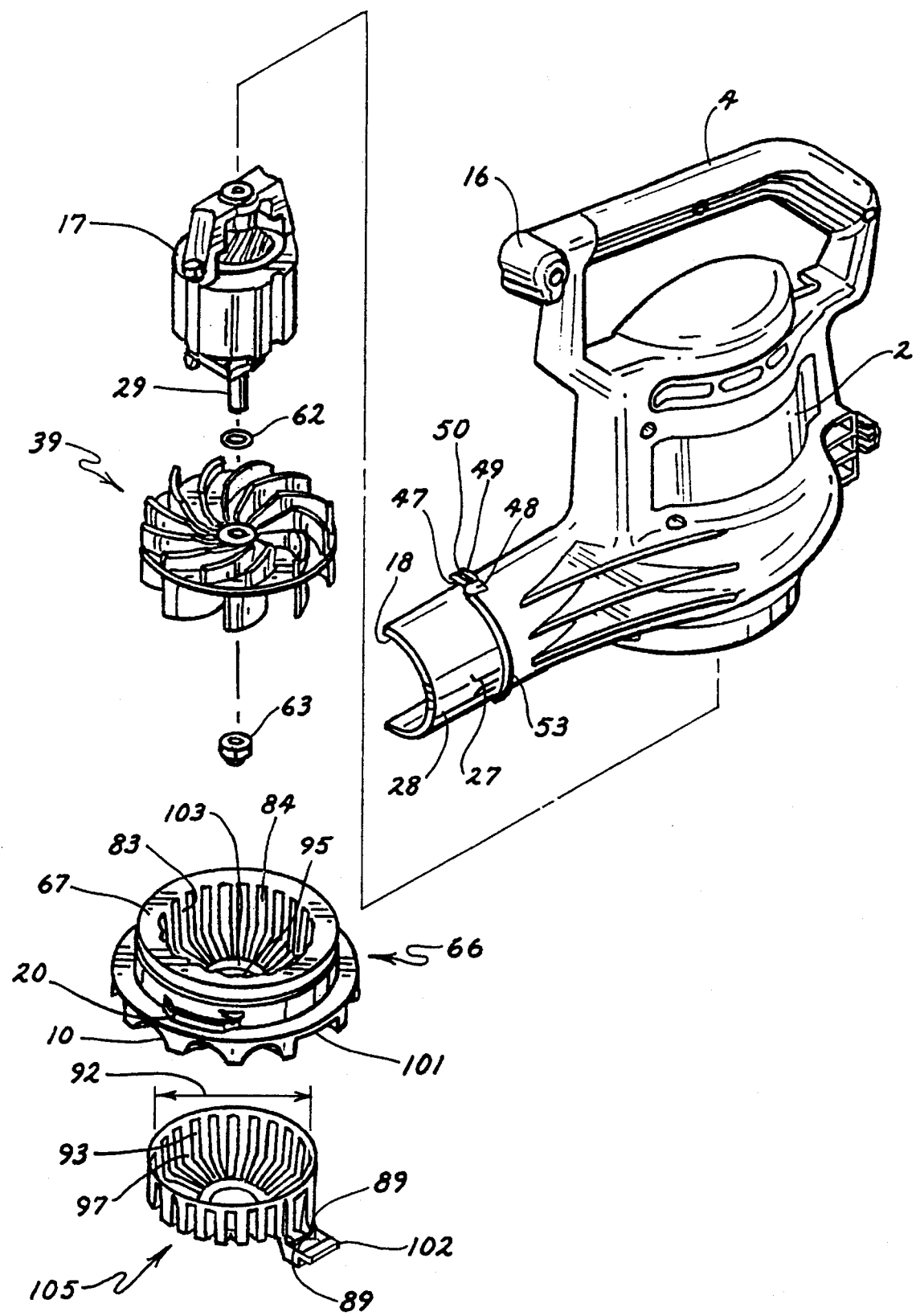
FIG. 4 is an exploded view of the preferred housing assembly including the preferred air inlet cover assembly.

FIGS. 1 and 2 show an electric blower/vac 1. The blower/vac 1 includes a housing 2 that is constructed of a plastic material such as ABS. A primary handle 4 is located at the top of the housing 2. A generally cylindrical primary handle extension 16 is located at the front of the primary handle 4 and has a longitudinal axis that runs perpendicularly to the longitudinal axis of the primary handle 4. The housing 2 includes an air inlet opening 64 and a housing outlet 28 which includes an outlet orifice 18. The air inlet opening 64 resides in a first plane while the outlet orifice 18 lies in a second plane that is substantially perpendicular to the first plane. An electric motor 17 is mounted within the housing 2. A motor output shaft 29 extends downwardly from the motor 17. The motor output shaft 29 runs in a direction that is generally perpendicular to the plane that the air inlet opening 64 lies in. An impeller 39 is attached to the output shaft 29 of the electric motor 17 and is secured with a washer 62 and a nut 63 as shown in FIG. 4.

Electrical energy is selectively supplied to the electric motor 17 as follows. A male electrical cord connector 33 is adapted for mounting between the halves of the housing 2 so that it protrudes outwardly from the housing 2 when it is assembled. The connector 33 can be connected to an extension cord (not shown) that delivers electricity from a female electrical outlet (not shown). Electrical wires 32 and 34 carry the current from the connector 33. An electrical switch 35 is wired in series with the motor 17 and connector 33 and opens and closes the electrical circuit for the motor. An actuator 37 mounts directly over switch 35 such that movement of actuator 37 from one side to the other causes switch 35 to move from an open circuit position to a closed circuit position or vice versa. A safety interlock switch 38 is connected in series to the motor 17 and switch 35 by wires 30a and 34a. Safety interlock switch 38 and its function will be discussed in more detail below.

An air inlet cover 66 is adapted to be removably engaged over the air inlet opening 64. The air inlet cover is shown in detail in FIGS. 4, 7, 8 and 9. Air inlet cover 66 is designed to permit air to be drawn into the housing 2 when the impeller 39 is rotated by the motor 17. Air inlet cover also acts as a guard over the impeller to prevent the operator from contacting the rotating impeller 39. The air inlet cover 66 also includes an actuating system, which will be discussed in more detail below, that closes the contacts of the safety interlock switch 38 when the cover 66 is properly engaged over the air inlet opening 64 and which opens the safety interlock switch when the cover 66 is removed from the air inlet opening 64. The air inlet cover 66 also includes a means for increasing the efficiency of the blower/vac when it is operated in the blower mode. Finally, the air inlet cover 66 includes a means for adjusting the air inlet area through the cover 66. All of these features will now be discussed in more detail.

The air inlet cover 66 includes a series of spokes and openings defining an air grate. The air grate allows the passage of air through the cover 66 while at the same time providing a barrier for passage of objects that could come into contact with the rotating impeller 39. A series of radially disposed grate spokes 100 extend radially away from a hub opening 95 located at the center of the air inlet cover 66. The radially disposed grate spokes 100 define a series of radially disposed grate orifices 96 that are interposed between the radially disposed grate spokes 100. A series of vertically or axially disposed grate spokes 83 extend generally perpendicularly up, as viewed in FIG. 4, and away from the radially disposed grate spokes 100. The vertically disposed grate spokes 83, in the preferred embodiment, are actually extensions of the radially disposed grate spokes 100 since the air inlet cover 66 is an integrally molded plastic component. The vertically disposed grate spokes 83 define a series of vertically disposed grate orifices 84 that are interposed between the vertically disposed grate spokes 83.

The vertically disposed grate spokes 83 terminate at their uppermost ends by supporting a pressure ring 67. The pressure ring 67 is designed to increase the efficiency of the impeller 39 when the air inlet cover 66 is engaged over the air inlet opening 64. When the air inlet cover 66 is engaged over the air inlet opening 64, the pressure ring 67 is positioned immediately adjacent to the impeller 39. When the impeller 39 is rotating, it draws air in through the air grate and expels it through the outlet orifice 18 of the housing outlet 28. The pressure ring 67 reduces the amount of air that leaks or spills over from the high pressure side of the impeller 39 blades. By reducing the spillover of air, the efficiency of the impeller 39 is increased. That is, the output air horsepower of the impeller 39 is increased for a given motor output (shaft) horsepower. Without the pressure ring 67, the impeller 39 would spill more air axially rather than discharging it radially as is desirable.

Figure 9:
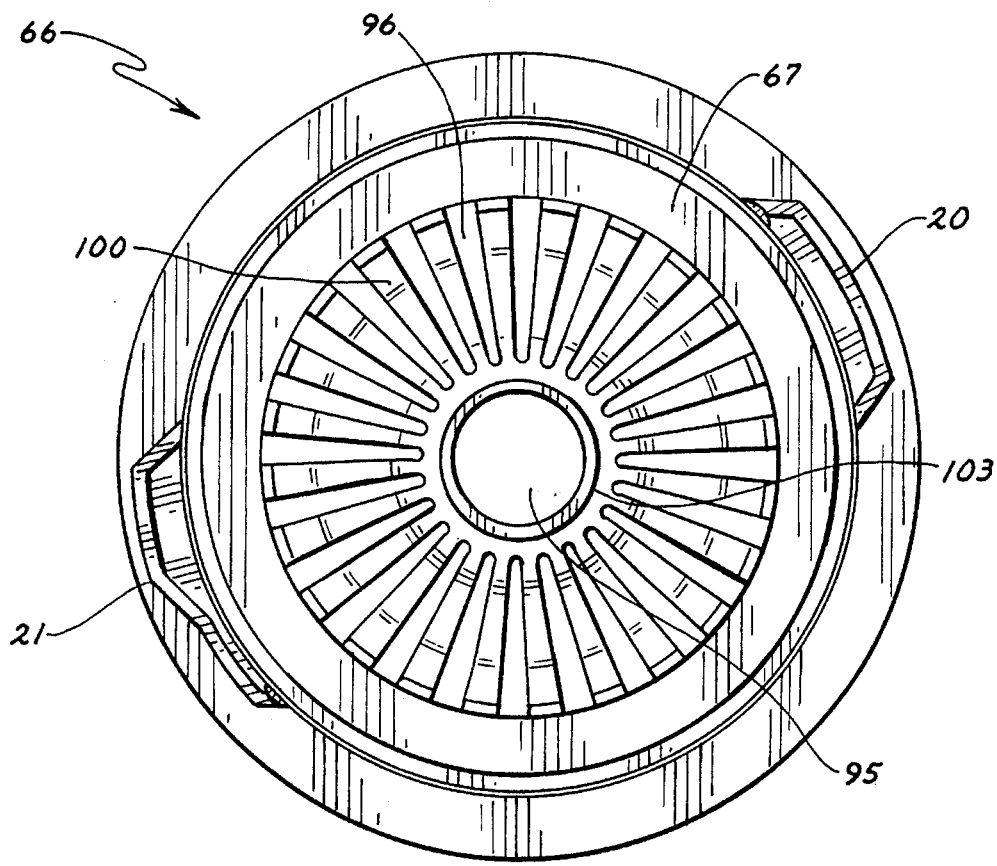
FIG. 9 is a top plan view of the air inlet cover of the preferred blower/vac.
Figure 11:
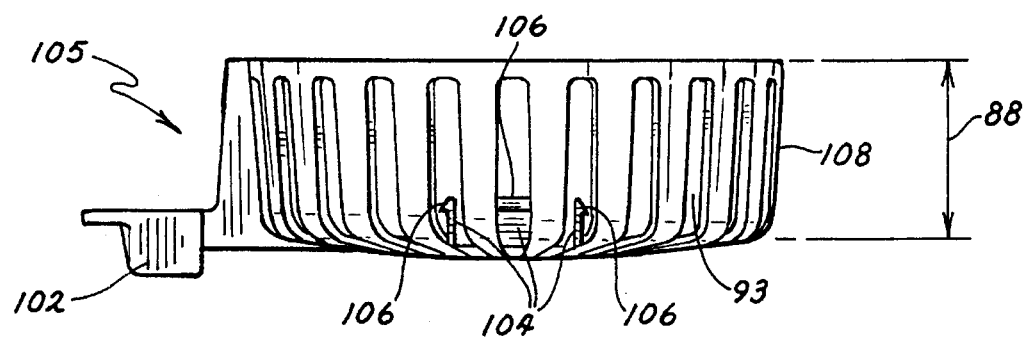
FIG. 11 is a side elevational view of the adjustable choke member of the preferred blower/vac.

An adjustable choke member 105 is adapted to "snap-fit" over the air inlet cover 66. The adjustable choke member 105 is shown in FIGS. 4, 10, 11 and 12. Adjustable choke member 105 includes a hub region 107 and a perimeter region 108. A total of four clips 104 extend perpendicularly from the hub region 107 as shown in FIG. 11. The clips 104 include raised portions 106 at the ends of the clips 104 furthest from the hub 107. The four clips 104 are spaced angularly apart from one another by 90 degrees. The clips 104 are also spaced radially from the center of the hub 107 such that the clips 104 can be inserted into the hub opening 95 of air inlet cover 66, thus axially restraining the choke member 105 onto the air inlet cover 66. The raised portions 106 of the clips 104 retain the choke member 105 axially as the raised portions "hook" the inside of the hub opening 95 along bearing surface 103 of air inlet cover 66 (FIG. 9.).

Figure 8:
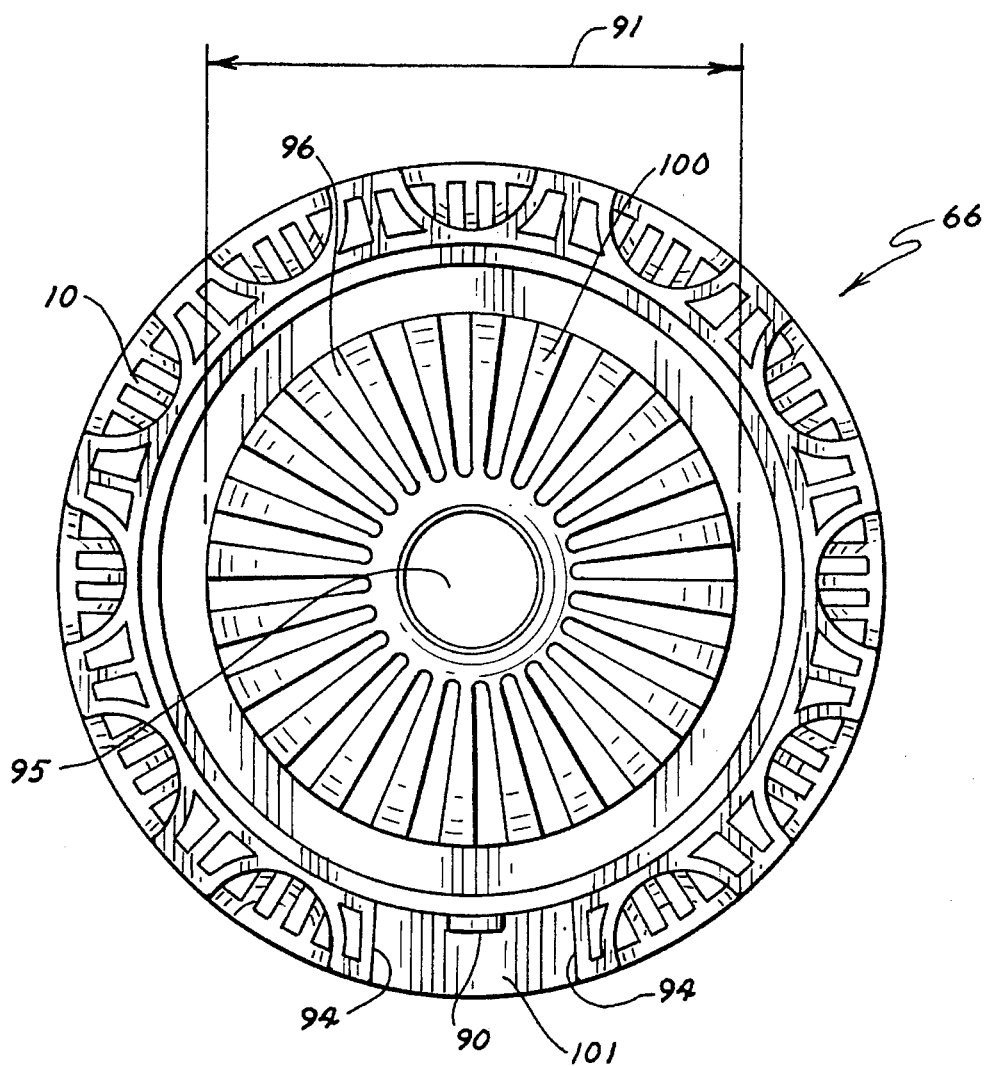
FIG. 8 is a bottom plan view of the air inlet cover of the preferred blower/vac.
Figure 10:
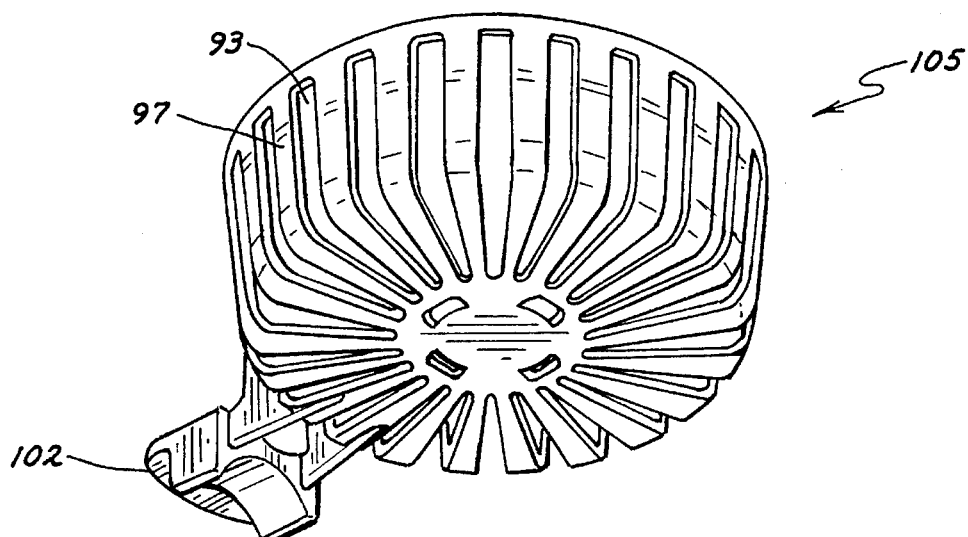
FIG. 10 is a perspective view of the adjustable choke member of the preferred blower/vac.

A choke lever 102 extends radially out from the choke member 105 as shown in FIGS. 4, 10, 11 and 12. When the choke member 105 is secured by a "snap fit" onto the air inlet cover 66 as described above, the choke lever 102 nests within the choke lever opening 101. The choke lever opening 101 is sized such that the choke lever 102 can move back and forth between the walls 94 of the choke lever opening 101 as shown in FIG. 8. This back and forth movement permits the choke member 105 to be pivotally rotated about the hub opening 95 of the air inlet cover 66. The total pivotal movement of the choke member 105 allowed by the preferred embodiment is approximately 5 to 10 degrees, since the walls 94 act as stops for the choke lever 102.

The choke member 105 includes a series of radially disposed choke spokes 99 extending between the choke hub region 107 and the perimeter region 108. A series of radially disposed choke orifices 98 extend between the choke hub region 107 and the perimeter region 108 and are interposed between the radially disposed choke spokes 99. A series of vertically disposed choke spokes 97 extend generally perpendicularly up, as viewed in FIG. 4, and away from the radially disposed choke spokes 99. The vertically disposed choke spokes 97 are, in the preferred embodiment, actually extensions of the radially disposed choke spokes 99 since the choke member 105 is an integrally molded element. The vertically disposed choke spokes 97 define a series of vertically disposed choke orifices 93 that are interspersed with the vertically disposed choke spokes 97.

The choke member 105 has an inner diameter 92 that is just slightly larger than the outer diameter 91 of the air grate portion of the air inlet cover 66. In the preferred embodiment, the inner diameter 92 and the outer diameter 91 both decrease slightly from the uppermost to lowermost points of the air inlet cover 66 and the choke member 105. This slight decrease in the diameters is provided as draft for getting the molded component out of the manufacturing mold. The slight difference between the diameters of the components permits a close fit between the choke member 105 and the grate portion of the air inlet cover 66 which, in turn, permits a tighter air seal between the choke member 105 and the grate portion of the cover 66 and, thus, better control over the air flow through the air inlet cover 66. The choke member 105 has a height 88 (see FIG. 11) such that, when the choke member 105 is secured onto the air inlet cover 66, the vertically disposed choke spokes 97 and vertically disposed choke orifices 93 are generally equal in length to the vertically disposed grate spokes 83 and the vertically disposed grate orifices 84. Also, the height 88 of the choke member is such that radially disposed choke spokes 99 and the radially disposed choke orifices 98 closely overlie the radially disposed grate spokes 100 and the radially disposed grate orifices 96. This relatively tight fit of the choke member 105 and its spokes and orifices in relation to the spokes and orifices of the grate provides for a relatively tight air seal when the orifices of the grate are closed off and also provides for a more controllable air adjustment system.

The choke member 105, as discussed above, is adapted to "snap fit" onto the air inlet cover 66. Once the choke member 105 is secured onto the air inlet cover 66, the choke member 105 can be pivoted back and forth about the hub opening 105 of the cover 66. When the choke member 105 is pivoted selectively in a first direction, the radially disposed choke spokes 99 obstruct the radially disposed grate orifices 96, and the vertically disposed choke spokes 97 obstruct the vertically disposed grate orifices 84. In this first position with the grate orifices generally obstructed by the choke spokes, the air inlet area of the air inlet cover 66 is greatly reduced. At least a small amount of air can pass through the clearance spaces between the choke member 105 and the grate of the air inlet cover 66 since there is no air tight seal between the choke member 105 and the air grate, even with the choke member 105 in the first position. That is, the air choke 105 and the air grate of the air inlet cover 66 do not fit together so tightly that they prohibit the passage of air through the air inlet cover 66 when the choke member 105 is in its first position.

Figure 12:
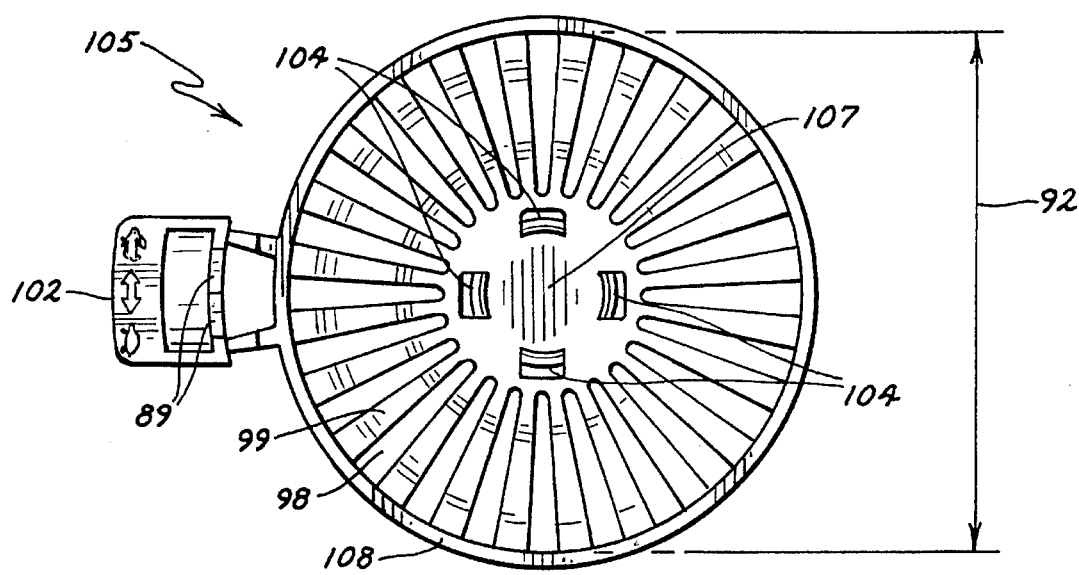
FIG. 12 is a top plan view of the adjustable choke member of the preferred blower/vac.

When the choke member 105 is pivoted in a second direction opposite to the first direction, the radially disposed choke spokes 99 move away from the radially disposed grate orifices 96, thus exposing the radially disposed grate orifices 96 for passage of air through the air inlet cover 66. Also, the movement of the choke member 105 in a second direction opposite to the first direction moves the vertically disposed choke spokes 97 away from the vertically disposed grate orifices 84, thus exposing the vertically disposed grate orifices 84 for passage of air through the air inlet cover 66. With the choke member 105 in its second position, the air intake area of the grate of the air inlet cover 66 is opened to its maximum. Thus, in this position, the airflow through the blower/vac 1 is maximized. A detent protrusion 90 is located in the choke lever opening 101 at a point approximately midpoint between the choke lever opening walls 94. Mating detent cavities 89 located on the upper side of the choke lever 102, as shown in FIGS. 4 and 12, interact with the detent protrusion 90 such that the choke member 105 is held in the first or second position and can only be moved out of position by a moderate amount of force. That is, the detent protrusion 90 and the detent cavities 89 interact to prevent inadvertent movement of the choke lever 102 and the choke member 105 from its set position relative to air inlet cover 66.

Figure 7:
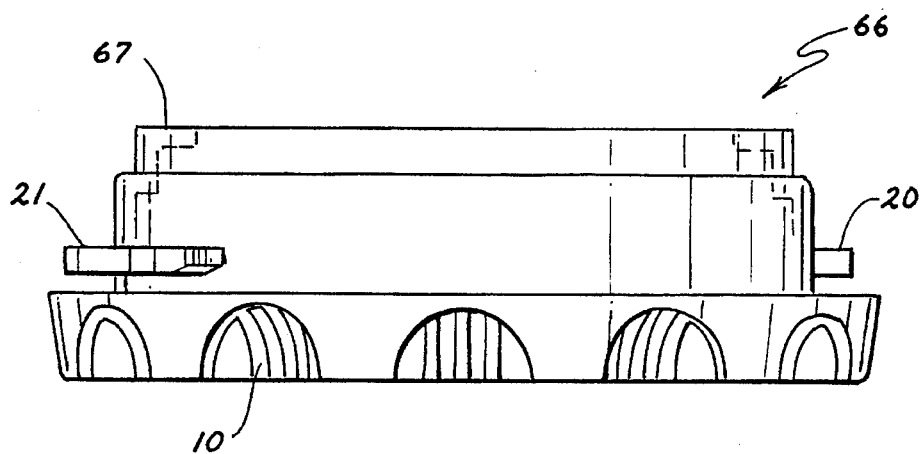
FIG. 7 is a side elevational view of the air inlet cover of the preferred blower/vac.
Figure 13:
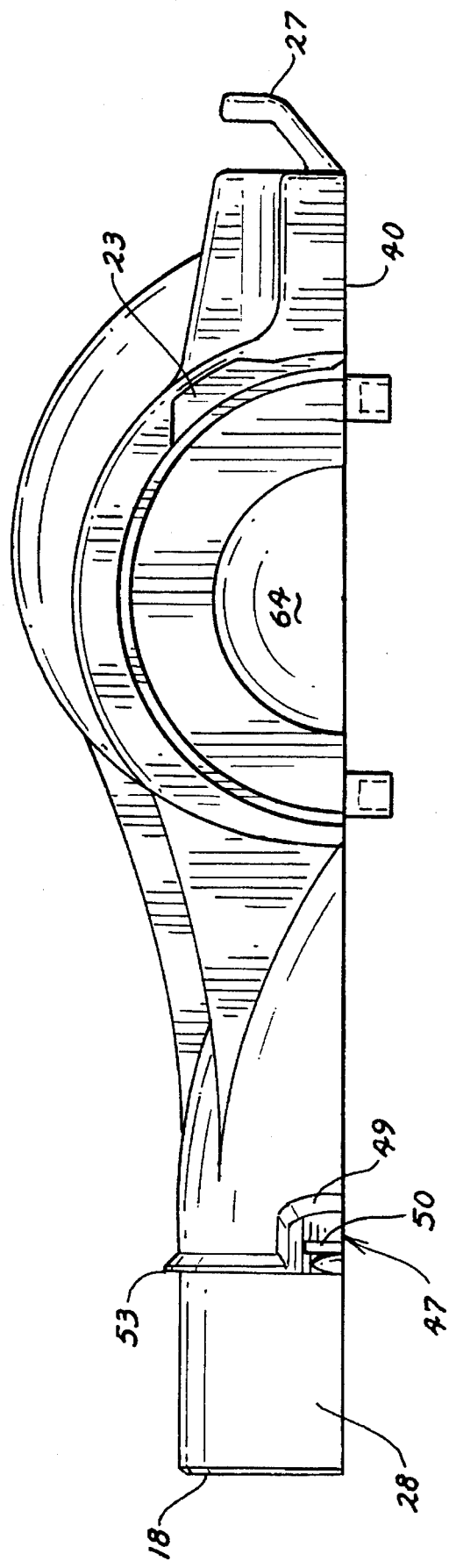
FIG. 13 is a bottom plan view of the left half of the housing of the preferred blower/vac.

The air inlet cover 66 also includes means for removably engaging the cover 66 over the air inlet opening 64. Male engagement members 20 and 21 are located approximately 180 degrees apart from one another on the perimeter of the air inlet cover 66. As can be seen in FIGS. 7 and 9, the two male engagement members 20 and 21 are different from one another. Matching slots 22 and 23 in the housing 2 of the blower/vac are positioned at the air inlet opening 64 and are best shown in FIG. 2 and 13. Slot 23 is sized so as to accept only male engagement member 21. Slot 22 is sized so as to accept only male engagement member 20. Thus, the air inlet cover 66 can only be engaged over the air inlet opening 64 in one orientation. In the preferred embodiment, the air inlet cover 66 is engaged over the air inlet opening 64 such that the choke lever 102 and the choke lever opening 101 are positioned at the left side (when viewed from the operator looking down) of the air inlet cover 66.

The safety interlock switch 38 is mounted in the housing 2 within a cavity 40 that is located at the rear of the air inlet opening 64. The cavity 40 is positioned just behind slot 23. The safety interlock switch includes an actuator 41 that protrudes out of the cavity 40 and into the area immediately adjacent to the slot 23. When the air inlet cover 66 is engaged over the air inlet opening 64, the male engagement member 21 engages and depresses the actuator 41 and closes the contacts in the switch 38. When the air inlet cover 66 is removed from over the air inlet opening 64, the male engagement member 21 moves away from the actuator 41, allowing the actuator 41 to extend back out from its depressed position. When the actuator 41 is again extended, the contacts of the safety interlock switch 38 are opened. The safety interlock switch 38 is connected in series to the electrical on-off switch 35. The electric blower/vac motor 17 cannot be energized unless the contacts of the safety switch 38 are closed and the contacts of the electrical on-off switch 35 are closed. Thus, if the contacts of the interlock switch 38 are open when the air inlet cover 66 is removed, the motor 17 cannot be energized even if the contacts of the on-off electrical switch 35 are closed.

The air inlet cover 66 also includes a series of quarter spherical indentations 10 spaced around the lower perimeter of the cover 66. In the preferred embodiment, a total of 11 quarter spherical indentations are spaced evenly around the lower perimeter of the air inlet cover 66. This is best shown in FIGS. 7 and 8. The quarter spherical indentations 10 are designed to comfortably accommodate the operator's fingers when grasping the air inlet cover 66 to engage it over the air inlet 64 or when removing it from the air inlet 64.

The air inlet cover 66 is retained over the air inlet opening 64 as follows. The air inlet cover 66 is aligned with the slots 22 and 23 so that the male engagement members 20 and 21 are aligned with the matching slots. Then the air inlet cover 66 is pushed onto the air inlet opening 64 so that the engagement members 20 and 21 pass through the corresponding slots 22 and 23. When the male engagement members 20 and 21 have cleared the slots 22 and 23, the air inlet cover 66 can then be rotated in a clockwise (looking at the cover from the bottom of the blower/vac) direction until a detent locking system (not shown) rotationally retains the air inlet cover 66. The locking force exerted by the detent system keeps the air inlet cover 66 from unwanted rotation but can be overcome by a moderate amount of force exerted by the operator. Thus, when the operator chooses to remove the air inlet cover 66, he simply needs to grasp the quarter spherical indentations 10 and rotate the air inlet cover 66 counter-clockwise until the detent retention force is overcome. Once the detent retention force is overcome, the air inlet cover 66 can be further rotated until the male engagement members 20 and 21 are aligned with the slots 22 and 23. At that point, the air inlet cover 66 can simply be lifted axially away from the air inlet opening 64 and removed from the housing 2.

Figure 3:
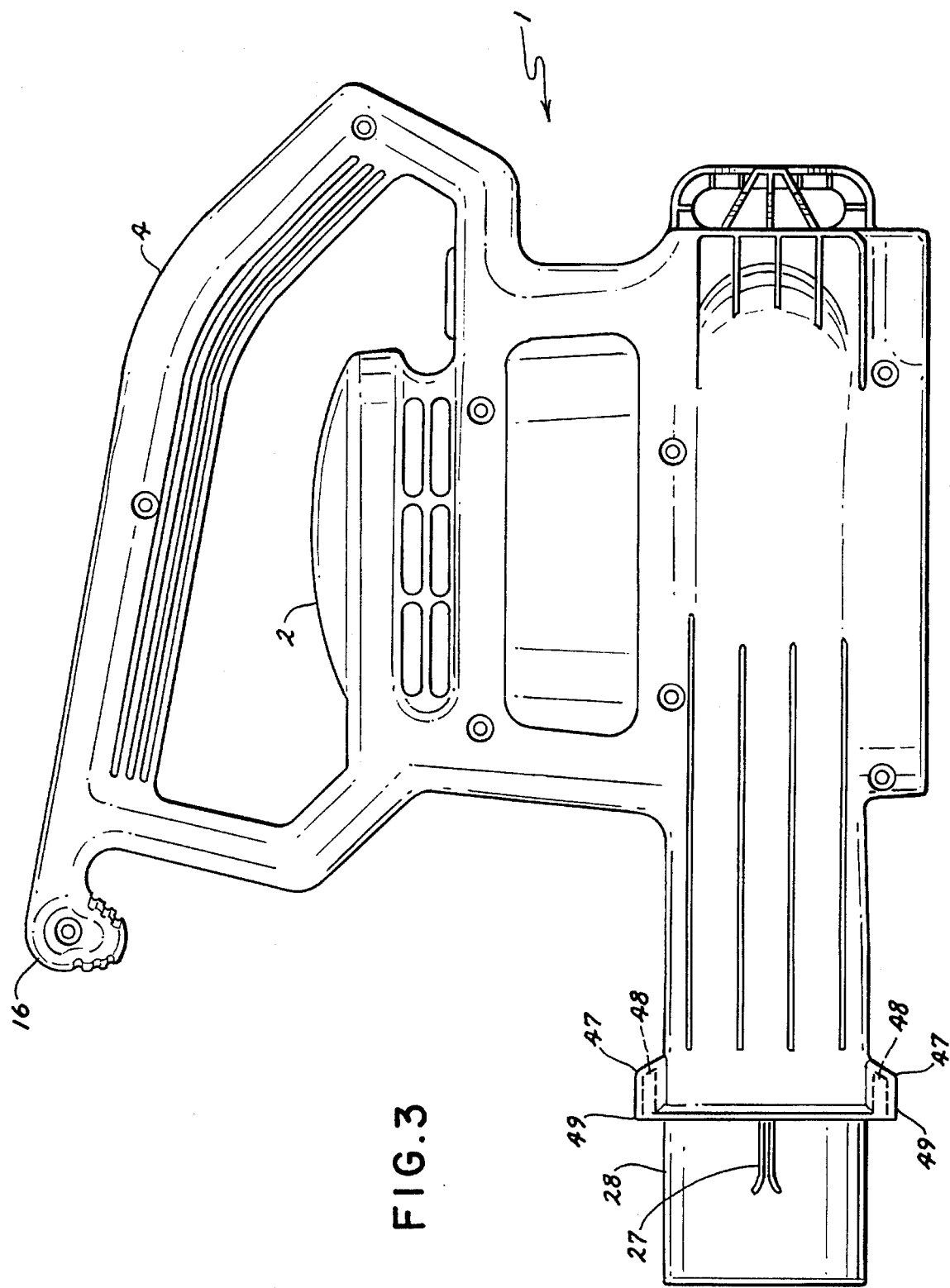
FIG. 3 is a left side elevational view of the preferred housing assembly.
Figure 5:
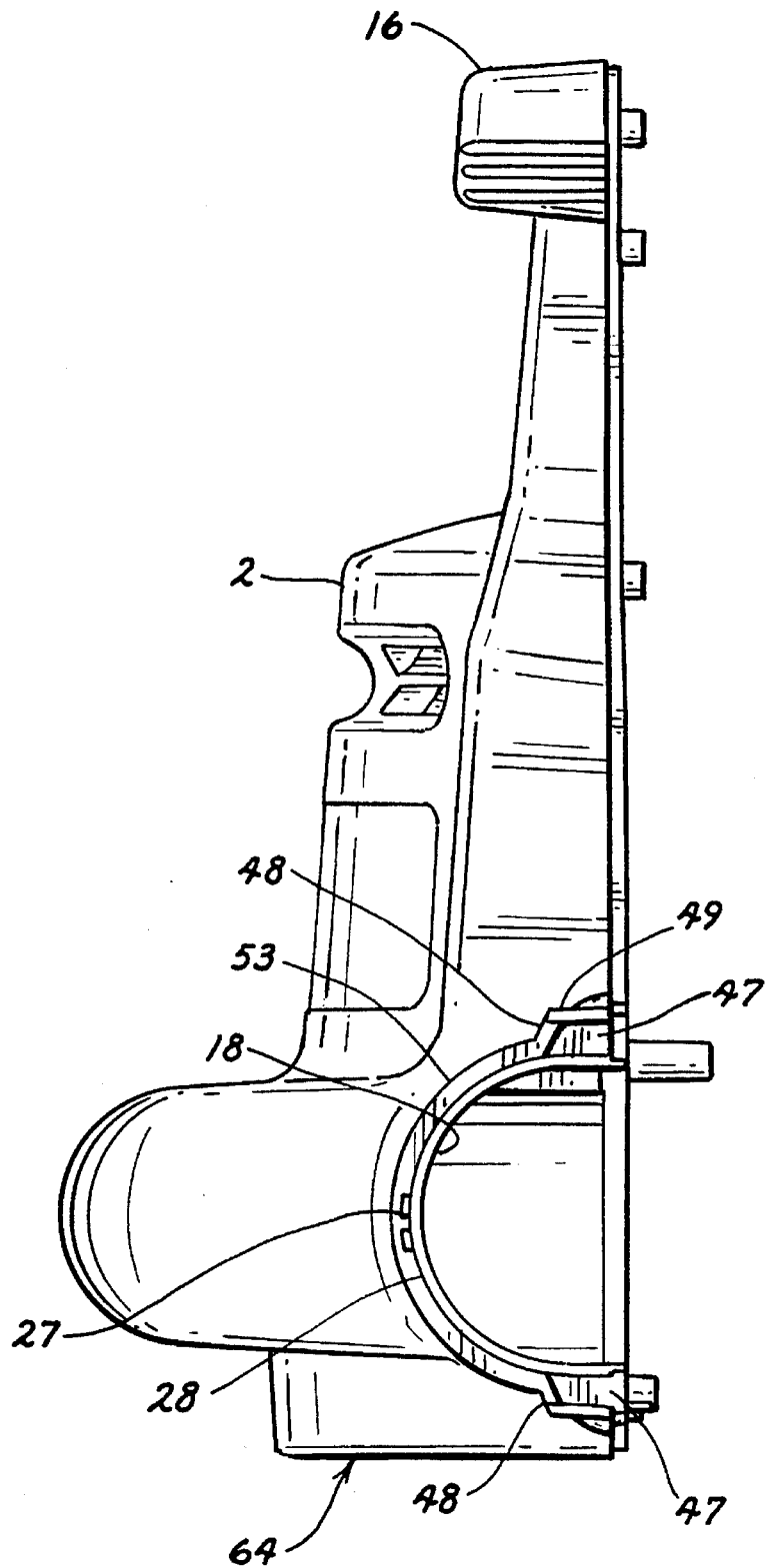
FIG. 5 is a front elevational view of the right half of the housing of the preferred blower/vac.
Figure 6:
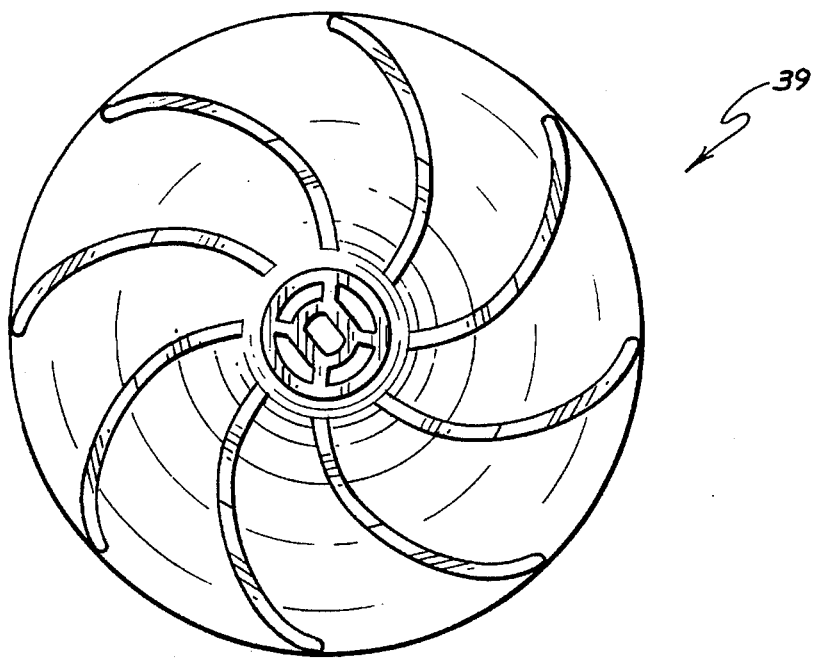
FIG. 6 is a bottom plan view of the impeller of the preferred blower/vac.
Figure 24:
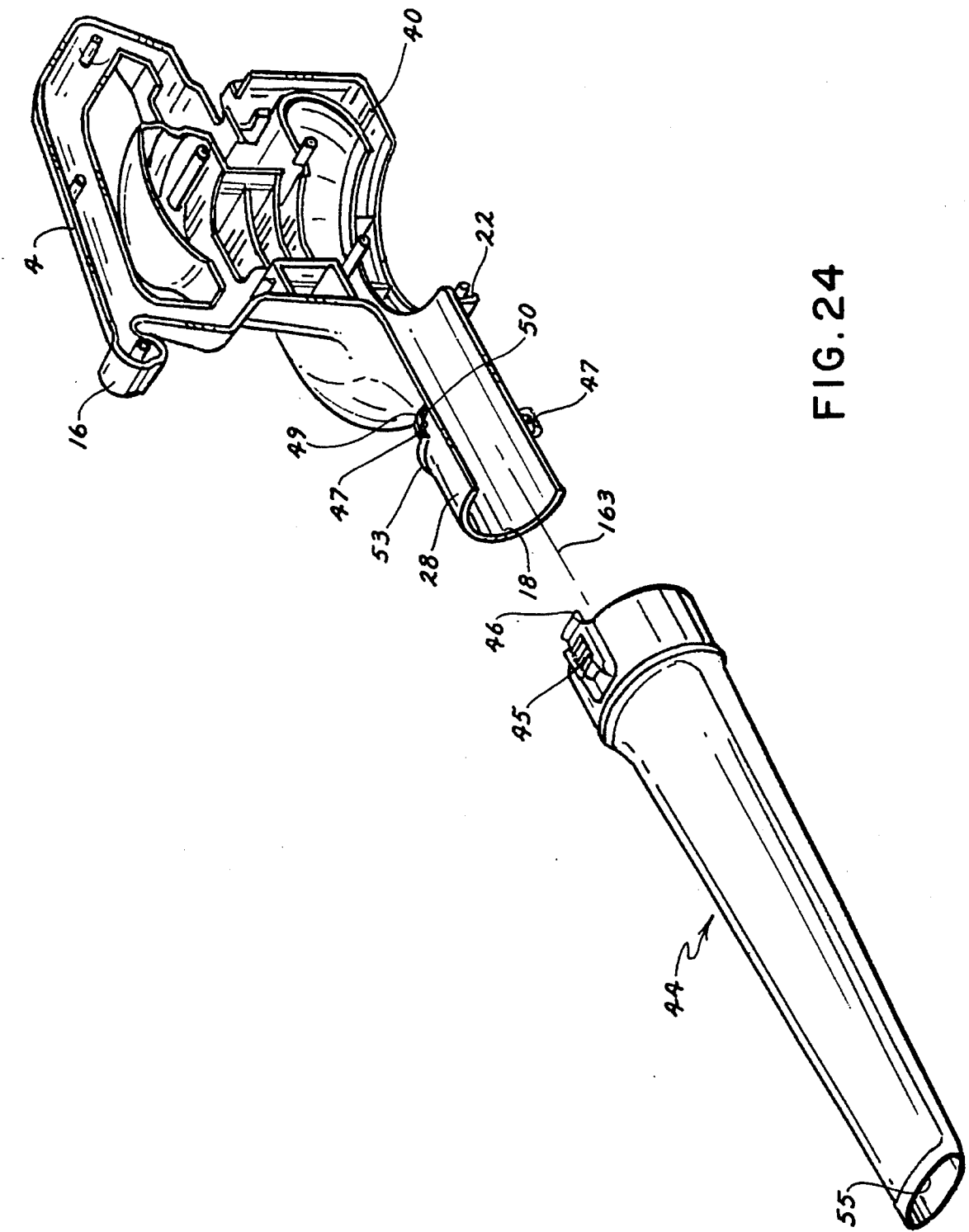
FIG. 24 is an exploded view of the preferred blower/vac with the blower tube.
Figure 27:
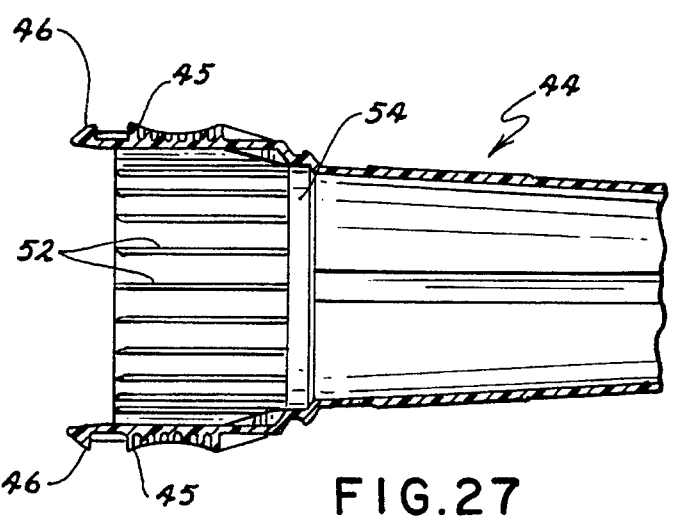
FIG. 27 is a partial side elevational view of the blower tube of the preferred blower/vac.

The electric blower/vac 1 includes a detachable discharge nozzle or blower tube 44. The blower tube 44 is configured so as to be detachably mountable onto the housing outlet 28. The blower tube 44 includes a set of resilient tabs 45 that extend from the upstream end of the tube 44. The tabs are positioned 180 degrees apart from each other so that one of the tabs 45 is situated at the top surface of the tube 44 while the other is situated at the bottom surface of the tube 44. This is best shown in FIGS. 24 and 27. Each tab 45 includes a lip 46 located at the far upstream end of each tab 45. The tabs 45 interact with mating receptacles 47 located on the perimeter of the housing outlet 28. The receptacles 47 are best shown in FIGS. 1, 2, 3, 4, 5 and 24. As best seen in FIGS. 3 and 5, each receptacle 47 is formed by first and second sidewalls 48 and a top surface 49. A slot 50 is formed in the top surface 49 of each receptacle 47. The resilient tabs 45 on the blower tube 44 are suitably dimensioned to fit within the receptacles 47. When the resilient tabs 45 of the blower tube 44 are inserted into the receptacles 47, the lips 46 of the tabs 45 engage the slots 50 of the receptacles 47, thus retaining the blower tube 44 onto the housing outlet 28. To release the blower tube 44 from the housing outlet 28, the resilient tabs 45 are simply depressed which removes the lips 46 from the slots 50 and which allows the tabs 45 and the tube 44 to be pulled away from the housing outlet.

Figure 28:
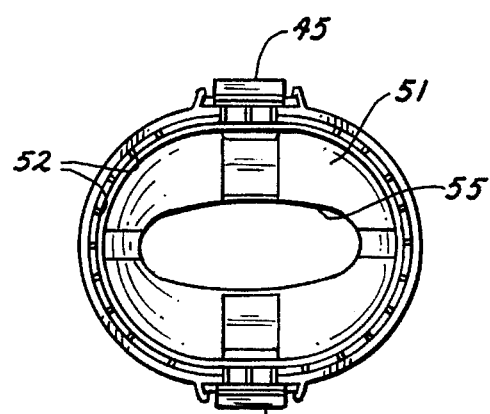
FIG. 28 is a rear end view of the blower tube of the preferred blower/vac.

The upstream end of the blower tube 44 has an opening 51 with a cross-section that is substantially identical to the cross-section of the housing outlet 28. The cross-section of the upstream opening 51 of the tube 44 is best shown in FIG. 28. This cross-sectional area, as well as the cross-sectional area of the housing outlet orifice 18, can best be described as two substantially parallel lines joined by two semi-circles. The inside of the upstream end of the blower tube 44 is dimensioned so that it fits snugly over the outside surface of the housing outlet 28. As described above, the resilient tabs 45 and mating receptacles 47 interact to secure the blower tube 44 onto the housing outlet 28 when the tube 44 is pushed onto the outlet 28. A flange 53 acts as a stop for the upstream end of the blower tube 44 as it is pushed onto the housing outlet 28.

A series of ribs 52 run longitudinally along the inner surface of the upstream end of the blower tube 44. The ribs 52 can be seen best in FIGS. 27 and 28. The ribs begin at the upstream opening 51 and then extend in a downstream direction to a smooth, continuous raised portion 54 that extends around the entire inner perimeter of the blower tube. The location of the raised portion is shown in FIG. 27. The raised portion 54 has a longitudinal axis that runs perpendicularly to the longitudinal axis of each rib 52. The longitudinal axis of the raised portion 54 is located approximately 2 inches from the upstream end of the blower tube 44. The raised portion 54 acts as an air seal between the housing outlet 28 and the blower tube 44 when the blower tube 44 is attached to the outlet 28. Thus, the ribs 52 act as guides for guiding the blower tube onto the housing outlet 28 while the raised portion 54, which is the last portion of the blower tube 44 that encounters the housing outlet 28 when the tube 44 is inserted onto the outlet 28, acts as an air seal between the two components. The ribs 52 not only guide the tube onto the outlet 28, they reduce the amount of force required to guide the tube 44 onto the outlet 28 compared to a full length, full contact surface. Also, the ribs 52 and the housing outlet 28 combine to reduce the detrimental effect caused by debris caught between the blower tube 44 and the housing outlet 28. Furthermore, a set of guides 27 located on the housing outlet 28 and as shown in FIGS. 3, 4, and 5, coact with the longitudinal ribs 52 to aid in guiding the blower tube 44 onto the housing outlet 28. The guides 27 are located 180 degrees apart from each other as seen in FIGS. 3 through 5. The guides 27 also cooperate with the longitudinal ribs 52 to reduce unwanted rotation of the blower tube 44 once it is fully attached to the housing outlet 28. In the preferred embodiment, only one rib 52 engages either guide 27.

Figure 25:
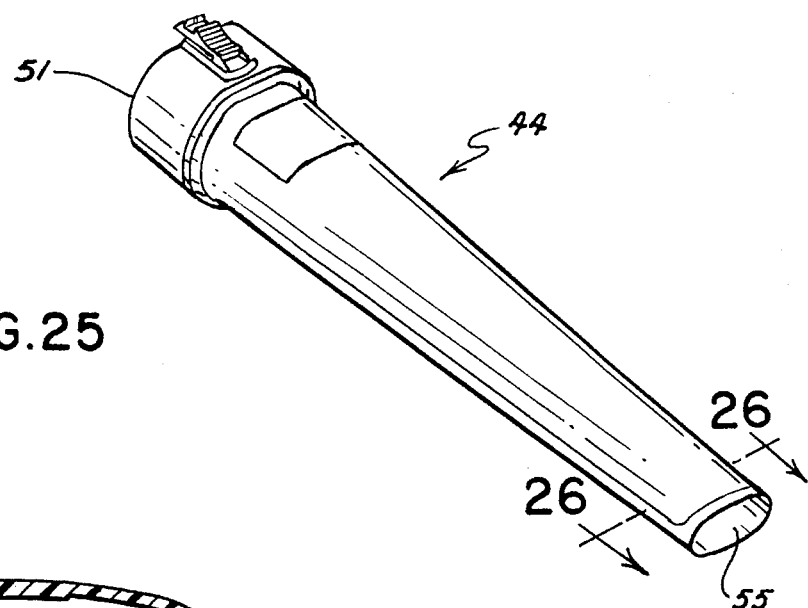
FIG. 25 is a perspective view of the blower tube of the preferred blower/vac.
Figure 26:
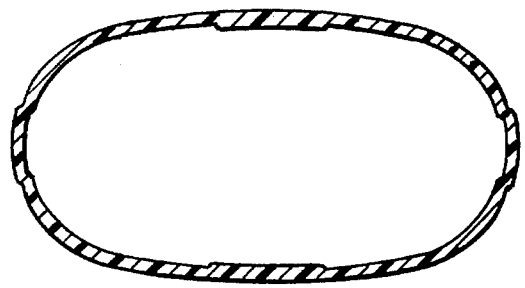
FIG. 26 is a sectional view taken along line 26—26 of FIG. 25 of the blower tube of the preferred blower/vac.

The blower tube 44 tapers from its upstream opening 51 to its downstream opening 55. The downstream opening 55 is shown best in FIGS. 24, 25 and 28. The downstream opening 55 has a generally ellipsoidal cross-section. In the preferred embodiment, the downstream opening 55 has a cross-sectional area that is approximately 25% of the cross-sectional area of the upstream opening 51. As shown in FIGS. 24 and 25, the reduction in cross-sectional area between the upstream opening 51 and the downstream opening 55 occurs gradually since the blower tube tapers from the upstream end to the downstream end. The reduction in cross-sectional area through the tube 44 causes the air to increase in velocity as it travels down the tube 44 into the smaller cross-sectional areas. The result is a high velocity stream of air discharged from the downstream opening 55 when the blower/vac is operated in the blower mode.

A vacuum bag collar 70 is shown in FIGS. 1, 20, 21, 22 and 23. Collar 70 is adapted to snap-fit onto housing outlet 28 and includes resilient tabs 71 that extend in an upstream direction from the upstream end of the collar 70. The resilient tabs 71 each include a lip 72 at the far upstream end of each tab 71. The lips 71 are configured so as to engage the slots 50 in the receptacles 47 located on the housing outlet 28. When the lips 72 engage the slots 50 of the receptacles 47, the collar 70 is retained on the housing outlet 28.

Collar 70 also includes a series of ribs 73 that run longitudinally along the inner upstream surface of the collar 73. The ribs 73 can be seen best in FIGS. 20 and 22. The ribs 73 begin at the upstream end of the collar 70 and extend in a downstream direction to a smooth, continuous raised portion 74 that extends around the entire inner perimeter of the collar 70. The raised portion 74 has a longitudinal axis that runs perpendicularly to the longitudinal axis of each rib 73. The longitudinal axis of the raised portion 74 is located approximately 2 inches from the upstream end of the vacuum bag collar 70. The raised portion 74 acts as an air seal between the housing outlet 28 and the collar 70 while the ribs 73 act as guides for guiding the collar 70 onto the housing outlet 28. The ribs 73 also reduce the amount of force required to guide the collar 70 onto the housing outlet 28. The collar 70 also includes a flange 75 that extends around the outer surface of the collar 70. The longitudinal ribs 73 on the vacuum bag collar 70 also interact with the guides 27 on the housing outlet 28, in the same manner that the ribs 52 on the blower tube 44 interact with the guides 27, to reduce unwanted rotation of the vacuum bag collar 70 once it is fully engaged on the housing outlet 28.

A vacuum bag 76 includes an opening 77 that has a Velcro strap 78 extending around the perimeter of the opening 77. The bag 76 also includes a shoulder strap 79 that extends from the top of the bag 76 to form a loop. The looped shoulder strap 79 is adapted to fit over the operator's shoulder when the blower/vac is operated in the vacuum mode. The strap 79 has adjustment means 80 for lengthening or shortening the strap 79. The opening 77 of the bag 76 is sized so that it fits over the flange 75 of the collar 70. Once the bag opening 77 has cleared the flange 75, the Velcro strap 78 can be adjusted so that the bag opening 77 is tightened around the collar 70, thus retaining the bag 76 onto the collar 70. The bag 76 is constructed of a somewhat porous fabric that permits the passage of air exhausted from the blower/vac but retains the debris collected while vacuuming. The bag 76 also includes a zipper 81 located at the bottom of the bag 76 for emptying debris.

Figure 15:
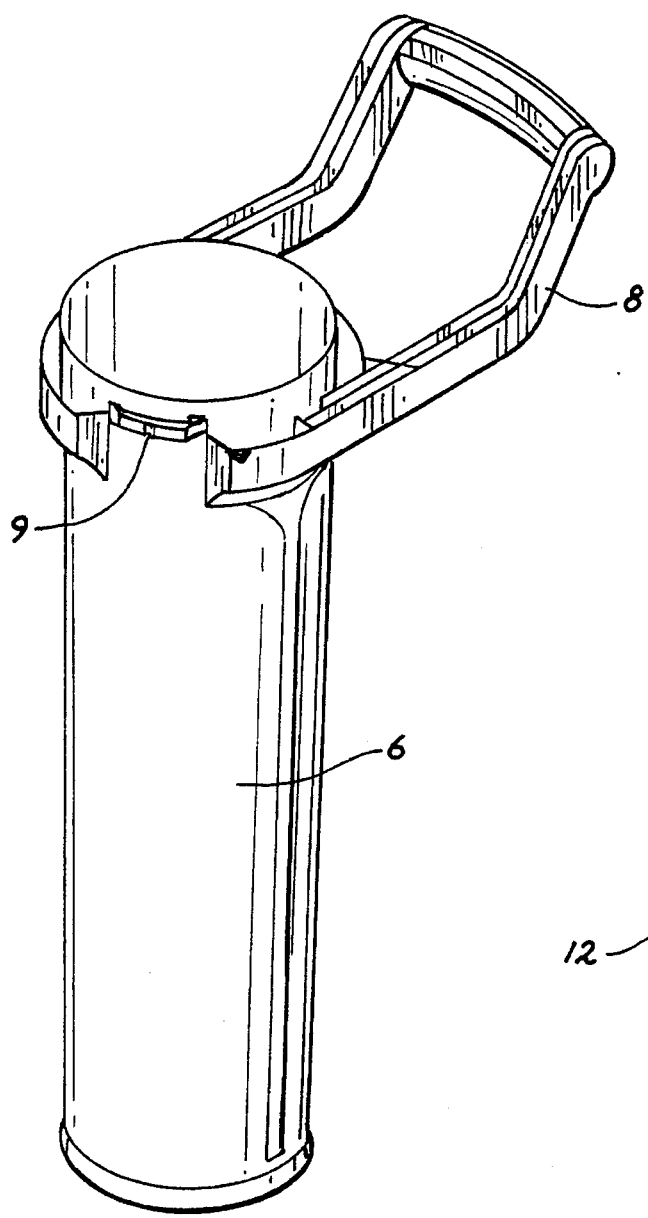
FIG. 15 is a perspective view of the upper portion of the vacuum tube assembly of the preferred blower/vac.
Figure 17:
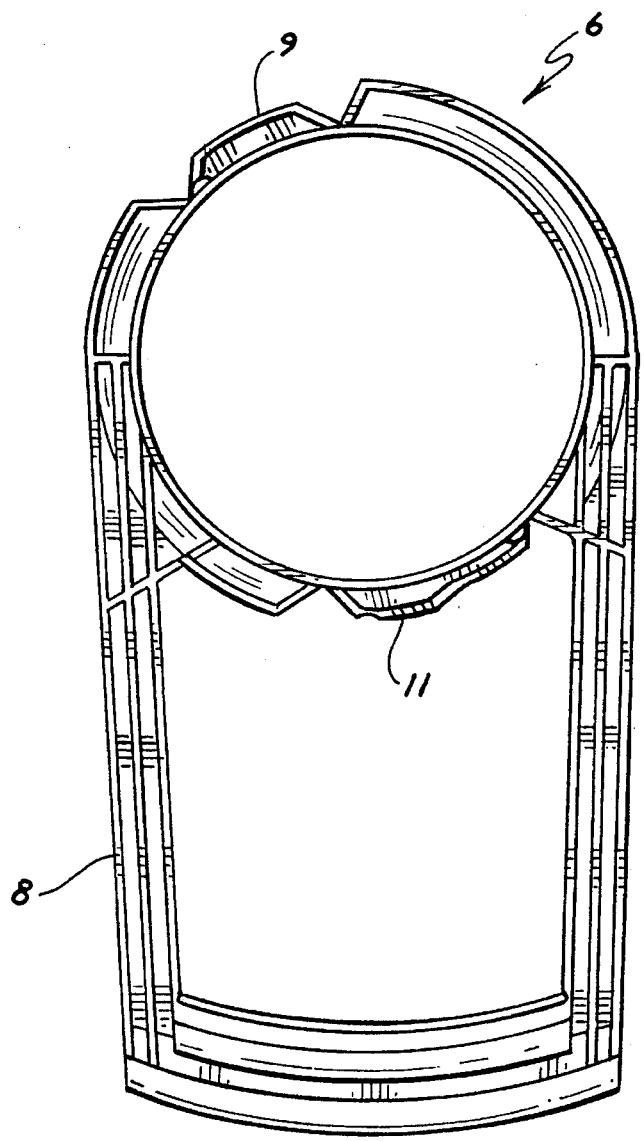
FIG. 17 is a top plan view of the upper portion of the vacuum tube of the vacuum tube assembly of the preferred blower/vac.

A vacuum tube assembly 5 is shown in FIG. 1. To operate the blower/vac in the vacuum mode, the vacuum tube assembly 5 must be connected to the air inlet opening 64 and the vacuum bag 76 and collar 70 must be connected to the housing outlet 28. The blower tube assembly 5 includes an upper vacuum tube 6 and a lower vacuum tube 7. The upper vacuum tube includes a secondary handle 8 that provides a secondary gripping surface for the operator when the unit is operated in the vacuum mode. The secondary handle 8 also provides a gripping surface that will aide the operator in maneuvering the upper vacuum tube 6 to connect it to the housing 2. The upper vacuum tube 6 has a generally cylindrical cross-section throughout its entire length. This cross-section can best be seen in FIGS. 1, 15 and 17. The upper vacuum tube 6 also has a set of male engagement members 9 and 11 located at the upper end of the tube as shown in FIGS. 1, 15 and 17. The male engagement members 9 and 11 are sized and positioned to engage the slots 22 and 23 on the housing in the same manner as the engagement members 20 and 21 of the air inlet cover 66 engage the slots 22 and 23. The male engagement member 11 also contacts and depresses the actuator 41 on the safety interlock switch 38 when the vacuum tube 6 is fully engaged over the air inlet 64. The contacts of the safety interlock switch 38 are thus closed. Thus, the male engagement members 9 and 11 interact with the slots 22 and 23 to form a means for connecting and disconnecting the vacuum tube 6 over the air inlet opening 64 of the housing 2.

Figure 14:
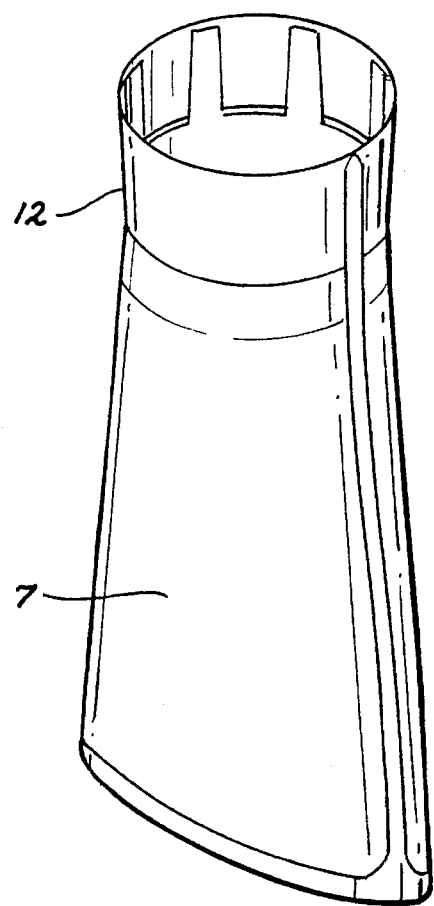
FIG. 14 is a perspective view of the lower portion of the vacuum tube assembly of the preferred blower/vac.
Figure 16:
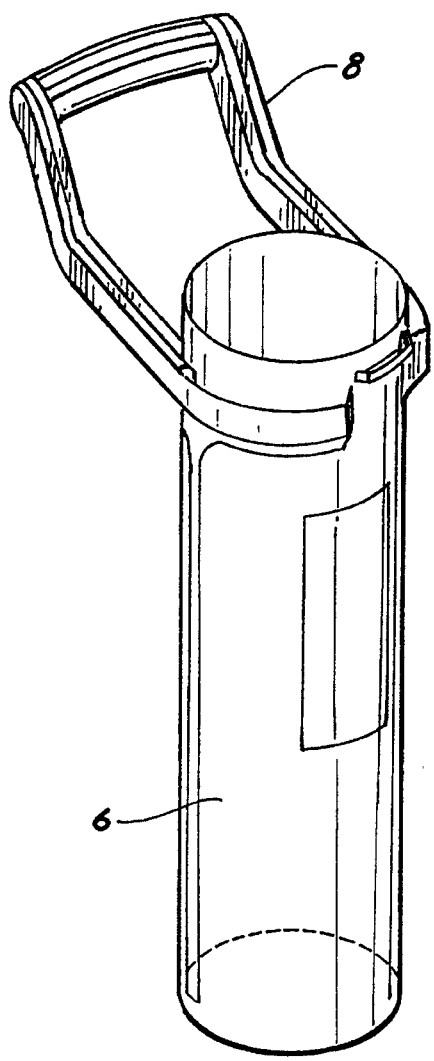
FIG. 16 is a second perspective view of the upper portion of the vacuum tube assembly of the preferred blower/vac.
Figure 18:
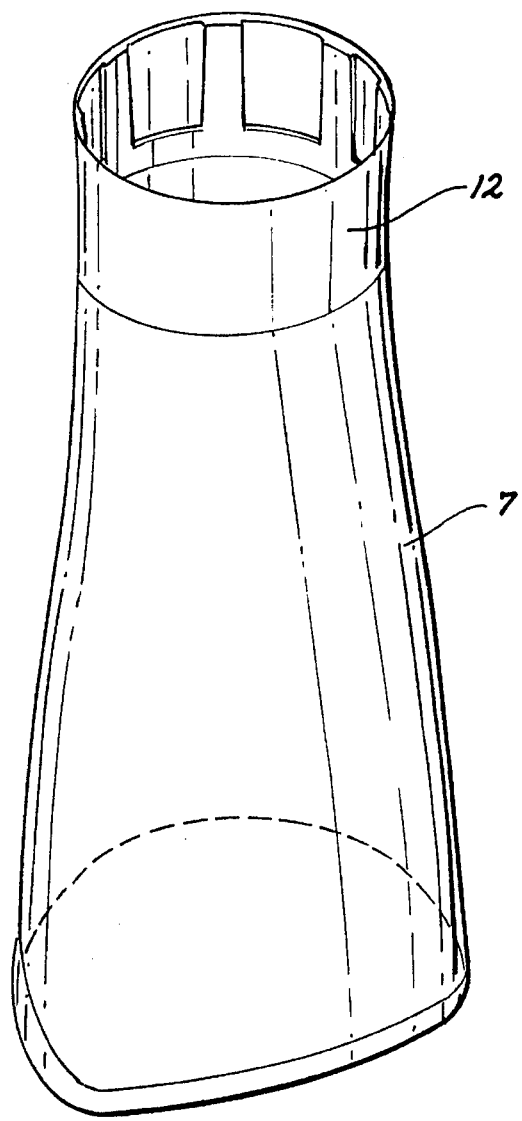
FIG. 18 is a second perspective view of the lower portion of the vacuum tube assembly of the preferred blower/vac.
Figure 19:
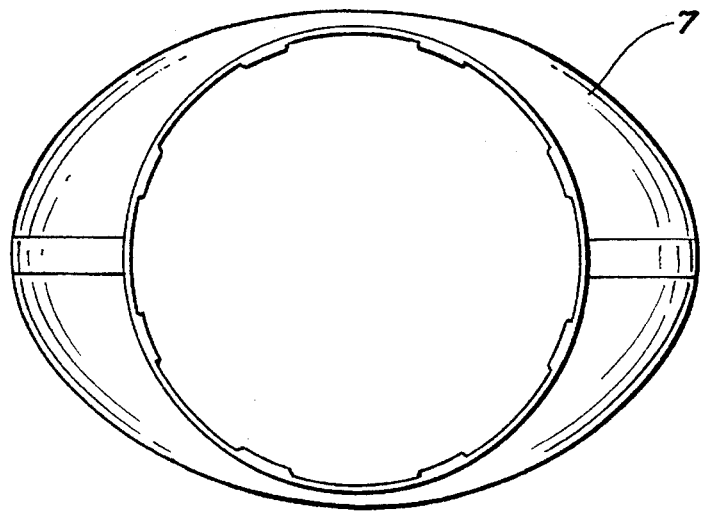
FIG. 19 is a top plan view of the lower portion of the vacuum tube assembly of the preferred blower/vac.
Figure 20:
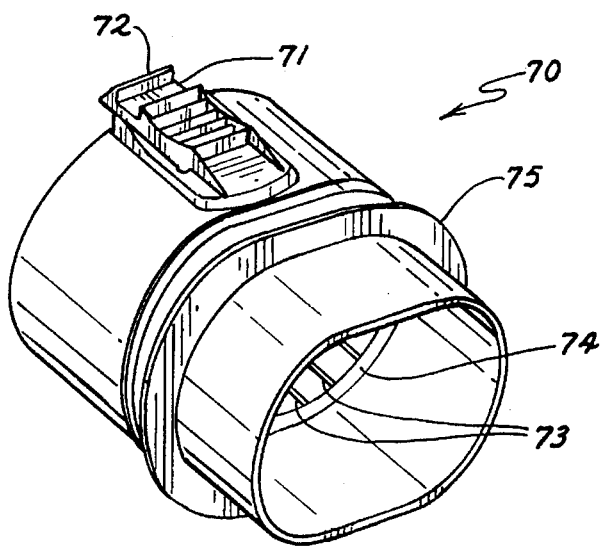
FIG. 20 is a perspective view of the vacuum bag collar of the preferred blower/vac.
Figure 21:
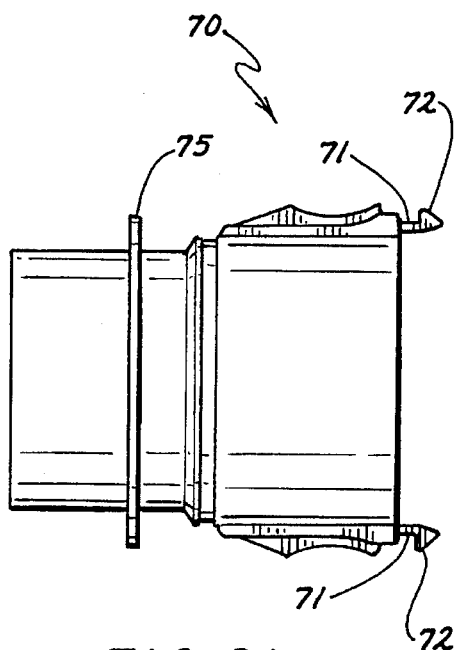
FIG. 21 is a side elevational view of the vacuum bag collar of the preferred blower/vac.
Figure 23:
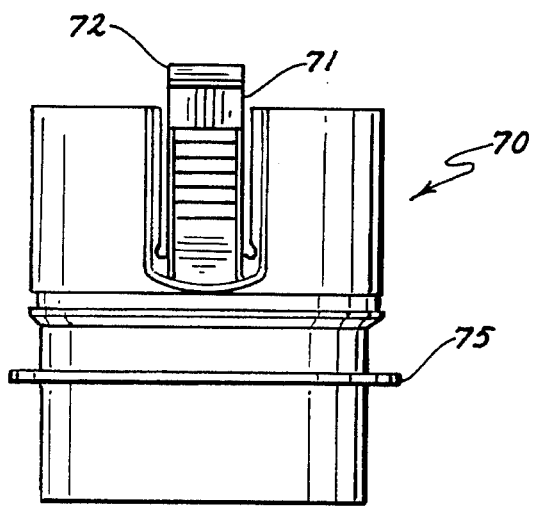
FIG. 23 is a top plan view of the vacuum bag collar of the preferred blower/vac.
Figure 22:
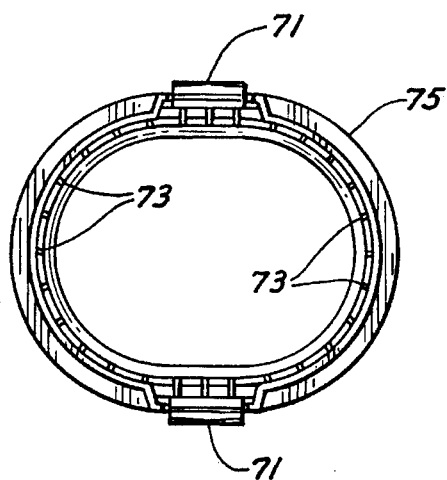
FIG. 22 is a rear elevational view of the vacuum bag collar of the preferred blower/vac.

The lower vacuum tube 7 is best shown in FIGS. 1, 14, 18 and 19. The top of the lower vacuum tube 7 is circular in cross-section and has an inner diameter that is slightly larger than the outer diameter of the lower end of the upper vacuum tube 6. Thus, the lower tube 7 is connected to the upper tube 6 by means of a frictional fit between the two tubes, the frictional fit created by the dimensional interference between the tubes. The lower tube's cross-section changes from substantially circular at its top end to a substantially ellipsoidal cross-section at its lower end. The ellipsoidal cross-section is best shown in FIG. 19. The change in cross-section is gradual from one end of the tube to the other. In the preferred embodiment, the circular cross-section runs from the top of the tube in a downward direction for approximately 2¼ inches. This extended cylindrical section 12 is shown in FIGS. 14 and 18. At the lower end of the cylindrical section 12, the transition from cylindrical to ellipsoidal cross-section begins and continues on down the lower end of the tube 7 until the ellipsoidal cross-section is fully developed.

Operation of the blower/vac is as follows. First, to operate the electric blower/vac in the blower mode, the operator should attach the blower tube 44 to the housing outlet 28 by sliding the tube 44 onto the housing outlet 28 until the lips 46 of the resilient tabs 45 engage the slots 50 of the receptacles 47. Then, the air inlet cover 66 must be engaged over the air inlet opening 64. To do this, the operator aligns the male engagement members 20 and 21 on the air inlet cover 66 with the corresponding slots 22 and 23 adjacent to the air inlet opening 64. Then the operator pushes the members 20 and 21 through the slots 22 and 23. Once the members 20 and 21 pass through the slots 22 and 23, the cover 66 is rotated clockwise (looking at the bottom of the housing) until the safety interlock switch 38 contacts are closed and the detent system engages the cover 66 to prevent unwanted rotation of the cover 66. The operator must also connect an extension cord to the male electrical cord connector. An electrical supply commensurate with the design of the motor is required. For example, a standard U.S. model blower/vac would require 120 volt-60 HZ alternating current while a European model would require 230 volt-50 HZ alternating current. Once the electrical supply cord is attached, the operator can energize the motor 17 by turning the switch 35 on with the actuator 37. The motor 17 rotates the impeller 39 at about 16,000 rpm in the preferred embodiment. The impeller 39 draws air up through the air grate of the air inlet cover 66. The pressure ring 67, which is positioned adjacent to the impeller 39 when the cover 66 is engaged over the inlet opening 64, reduces axial spillover off of the impeller blades, thus improving the impeller's efficiency. Air is expelled through the housing outlet 28 and the blower tube 44. As the air travels through the blower tube 44, the cross-sectional area of the tube 44 decreases and the velocity of the air stream increases. The velocity of the air stream is at its maximum when it passes through the downstream opening 55 of the tube. The operator typically holds the blower/vac by its primary handle 4 with one hand when using it in the blower mode. The downstream opening 55 and the exiting airstream is aimed at the debris to be moved. Airflow through the blower/vac can be adjusted by moving the choke member 105 as described above. Maximum airflow is desirable for use in moving heavier debris such as damp leaves while a lower airflow setting might be used when blowing lighter debris out of a garage.

To operate the blower/vac in the vacuum mode, the operator must turn off the switch 35 with the actuator 37 and remove the power supply cord from the cord connector 33. The blower tube 44 can be removed by depressing the resilient tabs 45 at the upstream end of the tube 44 and by pulling the tube 44 away from the housing outlet 28. The air inlet cover 66 must be removed by first rotating it in a counterclockwise direction (looking at it from the bottom) and then pulling it away from the air inlet opening 64. At this point, the upper vacuum tube 6 should be installed over the air inlet opening 64. The male engagement members 9 and 11 on the vacuum tube 6 must be aligned with the slots 22 and 23 near the air inlet opening 64. The vacuum tube 6 should be pushed towards the air inlet opening 64 so that the engagement members 9 and 11 pass through the slots 22 and 23. The operator can then rotate the vacuum tube 6 in a clockwise direction (bottom view) to lock it into place by grasping the secondary handle 8 and rotating the vacuum tube 6 as required. The lower vacuum tube 7 is then attached to the upper vacuum tube 6 by a frictional fit as described above. The vacuum bag 76 and vacuum bag collar 70 must next be attached to the housing outlet 28. The vacuum bag 76 and collar 70 might come assembled from the factory. If not, the bag 76 must be attached to the collar 70 by the operator in the manner described above. The collar 70 and bag 76 assembly can then be attached to the housing outlet 28 by aligning the resilient tabs 71 on the collar 70 with the receptacles 47 on the housing outlet and by pushing the collar 70 toward the outlet 28 until the tabs 71 snap into place within the receptacles 47. The bag 76 should be oriented as shown in FIG. 1 with the zipper 81 facing in a downward direction while the shoulder strap 79 is oriented in an upward direction. The operator can then attach the electrical supply cord to the cord connector 33 and turn the switch 35 to the on or run position.

Once the motor 17 is electrically energized, the operator can maneuver the blower/vac in the vacuum mode as follows. The operator can place the shoulder strap 79 of the vacuum bag over one shoulder. The operator can place one hand on the primary handle 4 and the other hand on the secondary handle 8. For ease of operation, the secondary handle 8 should be pointed in a forward direction while the operator is handling the blower/vac in the vacuum mode. That is, the primary handle 4 will be closer to the operator than the secondary handle 8 is during operation of the blower/vac in the vacuum mode. The vacuum tube assembly 5 will, of course, be directed in a downwardly extending direction while the unit is operated in the vacuum mode. Debris such as leaves can be vacuumed up through the vacuum tube assembly 5. The impeller 39 draws air and debris up through the vacuum tube assembly 5 and through the impeller 39. As debris passes through the impeller 39, it is chopped and reduced in volume. The air and debris is then exhausted through the housing outlet 28 and into the vacuum bag 76. The vacuum bag 76 is somewhat porous so that the exhaust air can pass through the bag 76 while the debris is retained by the bag 76. When the vacuum bag 76 fills with debris, the operator can proceed to empty it by turning the motor 17 off and by disconnecting the bag 76 and collar 70 from the housing outlet 28. The operator can then empty the bag 76 through the opened zipper 81. The bag can be emptied into a compost pile or into a suitable container for disposing of the debris. In the preferred embodiment, there is no means for adjusting the air speed of the blower/vac in the vacuum mode. The higher speed is desirable in the vacuum mode as it reduces the chances of debris clogging.

It should be noted that the preferred design of the vacuum tube assembly 5 provides an improved system for vacuuming debris. As described above, the lower end of the lower vacuum tube 7 includes a generally ellipsoidal cross-sectional area. The ellipsoidal opening at the lower end of the lower vacuum tube 7 has a larger cross-sectional area than the upper end of the lower tube 7 which has a circular cross-sectional area. The larger cross-sectional area at the bottom of the tube 7 reduces the likelihood of bridging of debris across the opening. The gradual taper to a smaller, circular cross-sectional area at the top of the lower tube 7 causes the incoming air and debris to accelerate as it moves upwardly through the lower tube 7. The upper tube 6 has a circular cross-sectional area throughout its entire length.

Also, in the vacuum mode, the blower/vac does not have the air inlet cover 66 attached over the air inlet opening 64. Thus, the pressure ring 67 is not in place near the impeller 39 when the unit is operated in the vacuum mode. While the overall air moving efficiency of the impeller 39 is reduced when the pressure ring 67 is not in place, the impeller 39 is less likely to clog with debris since the air inlet opening 64 is unrestricted. Thus, the debris handling capability of the impeller 39 is enhanced with the increased air inlet opening area available after the air inlet cover 66 and its pressure ring 67 are removed.

To convert the blower/vac from operation in the vacuum mode to operation in the blower mode, the operator must turn off the switch 35 and unplug the power supply cord from the electrical cord connector 33. The operator can then disconnect the vacuum bag 76 and vacuum bag collar 70 from the housing outlet 28 by depressing the resilient tabs 71 and pulling the collar and bag assembly axially away from the housing outlet 28. Next, the operator must remove the vacuum tube assembly 5 from the air inlet opening 64. This can be accomplished by grasping the secondary handle and rotating the vacuum tube assembly 5 until the engagement members 9 and 11 can pass through the slots 22 and 23. At that point, the vacuum tube assembly 5 can be pulled away from the air inlet opening 64. The blower/vac unit is now ready to be assembled back into the blower mode as described above.

A preferred embodiment of the invention is described above. Those skilled in the art will recognize that many embodiments are possible within the scope of the invention. Variations and modifications of the various parts and assemblies can certainly be made and still fall within the scope of the invention. Thus, the invention is limited only to the apparatus recited in the following claims and equivalents thereof.

We claim:

1. An air moving apparatus, comprising:
    (a) a housing, the housing including an air inlet opening and a housing outlet;

(b) a motor, the motor being affixed to an interior region of the housing;

(c) an impeller, the impeller being affixed to an output shaft of the motor, the impeller drawing air through the air inlet opening and discharging air through the housing outlet; and (d) an integrally formed air grate and pressure ring assembly, the air grate and pressure ring assembly being removably mounted over the air inlet opening wherein the air grate and pressure ring assembly further comprises an adjustable choke member, the choke member permitting adjustment of the air flow rate through the air grate and pressure ring assembly and wherein the choke member is pivotally engaged to the air grate and pressure ring assembly and wherein the hub of the choke member is snap fit onto the grate and ring assembly.

2. The air moving apparatus of claim 1, wherein the choke member further comprises a choke lever extending radially outward from the outer perimeter of the choke member, wherein the extended choke lever provides the operator with a lever arm for pivoting the choke member between first and second positions and wherein the choke lever includes detent means for retaining the choke lever and the choke member in the first and second positions once a desired position has been selected by the operator.

3. An apparatus for entraining and discharging air, comprising:

(a) a housing containing an air inlet, a housing outlet and a motor, the motor having an output shaft;

(b) an impeller, the impeller being operatively connected to the output shaft so as to draw atmospheric air into the air inlet and discharge air through the housing outlet; and (c) an air inlet cover, the air inlet cover being removably engageable over the air inlet and including:

(i) a pressure ring for increasing the efficiency of the impeller when the air inlet cover is engaged over the air inlet; and (ii) an air grate, the air grate including a plurality of radially disposed grate orifices extending between a hub region and a perimeter region, the air grate being concentric with the pressure ring.

4. The apparatus of claim 3 wherein the air inlet cover further comprises:

(a) an upper surface, the upper surface defining the pressure ring; and (b) a lower surface, the lower surface including a plurality of quarter spherical indentations each adapted to receive a fingertip so as to permit the air inlet cover to be grasped and rotated.

5. The apparatus of claim 4, further comprising an adjustable choke member, the choke member including a hub and a perimeter, the choke member including a plurality of radially disposed choke spokes extending between the hub and the perimeter.

6. The apparatus of claim 5, wherein the choke member further comprises at least one fastener adjacent to the hub, the fastener being adapted to pivotally engage the air grate hub in a snap fit arrangement such that rotation of the choke member in one direction causes the radially disposed choke spokes to obstruct the radially disposed grate orifices and such that rotation of the choke member in a second direction opposite to the first direction causes the radially disposed choke spokes to move away from and expose the radially disposed grate orifices.

7. The apparatus of claim 6, wherein the air grate further comprises a plurality of vertically disposed grate orifices for passage of air through the air inlet cover extending generally perpendicularly down and away from the pressure ring, and wherein a plurality of vertically disposed grate spokes defining the vertically disposed grate orifices provide support for the pressure ring.

8. The apparatus of claim 7, wherein the adjustable choke member further comprises a plurality of vertically disposed choke spokes extending generally perpendicularly up and away from the radially disposed choke spokes extending between the hub and the perimeter.

9. The apparatus of claim 8, wherein rotation of the choke member in one direction causes the vertically disposed choke spokes to obstruct the vertically disposed grate orifices and wherein rotation of the choke member in a second direction causes the vertically disposed choke spokes to move away from and expose the vertically disposed grate orifices.

10. The apparatus of claim 9, wherein the air inlet cover further comprises a tab and wherein the air inlet further comprises a mating slot and channel for the tab such that the air inlet cover is engaged over the air inlet when the tab is inserted into the slot and the air inlet cover is rotated so that the tab is retained within the channel and wherein the air inlet cover is released from its engagement over the air inlet when the inlet cover is rotated so that the tab slides out of the channel and passes back out through the slot.

\* \* \* \* \*